US010545486B2

(12) United States Patent
Byron et al.

(10) Patent No.: US 10,545,486 B2
(45) Date of Patent: Jan. 28, 2020

(54) SYSTEMS, METHODS, DEVICES, AND COMPUTER READABLE MEDIUM FOR REAL AND NEAR-REAL TIME SENSOR DATA CAPTURE AND ANALYSIS

(71) Applicant: MASITEK INSTRUMENTS INC., Moncton (CA)

(72) Inventors: Jeremy Byron, Shediac Cape (CA); Tracy Clinch, New Maryland (CA)

(73) Assignee: MASITEK INSTRUMENTS INC., Moncton (CA)

( * ) Notice: Subject to any disclaimer, the term of this patent is extended or adjusted under 35 U.S.C. 154(b) by 65 days.

(21) Appl. No.: 14/689,704

(22) Filed: Apr. 17, 2015

(65) Prior Publication Data
US 2015/0301521 A1    Oct. 22, 2015

Related U.S. Application Data

(60) Provisional application No. 61/980,751, filed on Apr. 17, 2014.

(51) Int. Cl.
*G05B 19/418* (2006.01)
*G01P 15/18* (2013.01)

(52) U.S. Cl.
CPC .......... *G05B 19/4183* (2013.01); *G01P 15/18* (2013.01); *G05B 2219/31455* (2013.01); *G05B 2219/32033* (2013.01); *Y02P 90/10* (2015.11); *Y02P 90/18* (2015.11)

(58) Field of Classification Search
CPC ...... G05B 19/4183; G05B 2219/31455; G05B 2219/32033; G01P 15/18; Y02P 90/10; Y02P 90/18

USPC .......................................................... 700/108
See application file for complete search history.

(56) References Cited

U.S. PATENT DOCUMENTS

| | | | | |
|---|---|---|---|---|
| 3,656,352 | A * | 4/1972 | Low ...................... | G01P 15/036 116/203 |
| 3,737,122 | A * | 6/1973 | Solov ...................... | F41G 7/34 244/3.21 |
| 6,448,549 | B1 | 9/2002 | Sufaee-Rad | |
| 7,982,764 | B2 | 7/2011 | Kadaba | |
| 9,124,664 | B1 * | 9/2015 | Ravindranath ..... | H04L 65/4084 |

(Continued)

OTHER PUBLICATIONS

WIPO, International Search Report dated Jun. 8, 2015, issued in corresponding International Patent Application No. PCT/CA2015/000252.

*Primary Examiner* — Kenneth M Lo
*Assistant Examiner* — Michael W Choi
(74) *Attorney, Agent, or Firm* — Norton Rose Fulbright Canada LLP

(57) ABSTRACT

The present disclosure relates to an integrated sensor system for monitoring, capturing, processing and analyzing data for delicate and fragile articles in real or near-real time movement within production, packaging and distribution systems. The system comprises a sensor platform that contains multiple on-board sensors detecting numerous force, environmental and movement variables; a handheld data receiver application in communication with said sensor module for issuing commands and processing captured data; and a web server application that is configured to receive information from one or more handheld data receiver applications and perform operations.

29 Claims, 11 Drawing Sheets

(56) References Cited

U.S. PATENT DOCUMENTS

| | | | |
|---|---|---|---|
| 2004/0111340 A1* | 6/2004 | Reel | G01D 9/005 |
| | | | 705/34 |
| 2004/0226392 A1* | 11/2004 | McNally | G01D 21/02 |
| | | | 73/866.1 |
| 2007/0061077 A1* | 3/2007 | Fateh | G01C 21/16 |
| | | | 701/507 |
| 2010/0010664 A1* | 1/2010 | Kadaba | G05B 19/0428 |
| | | | 700/225 |
| 2012/0262298 A1* | 10/2012 | Bohm | G01N 27/3274 |
| | | | 340/604 |
| 2012/0274470 A1 | 11/2012 | Sandvick | |
| 2015/0050950 A1* | 2/2015 | Alon | H04W 4/021 |
| | | | 455/456.1 |
| 2015/0051785 A1* | 2/2015 | Pal | G01P 15/18 |
| | | | 701/29.1 |
| 2015/0070190 A1* | 3/2015 | Wai Fong | G01J 1/4204 |
| | | | 340/870.3 |
| 2015/0168506 A1* | 6/2015 | Klotzbuecher | G01R 33/0035 |
| | | | 324/251 |

\* cited by examiner

FIGURE 6
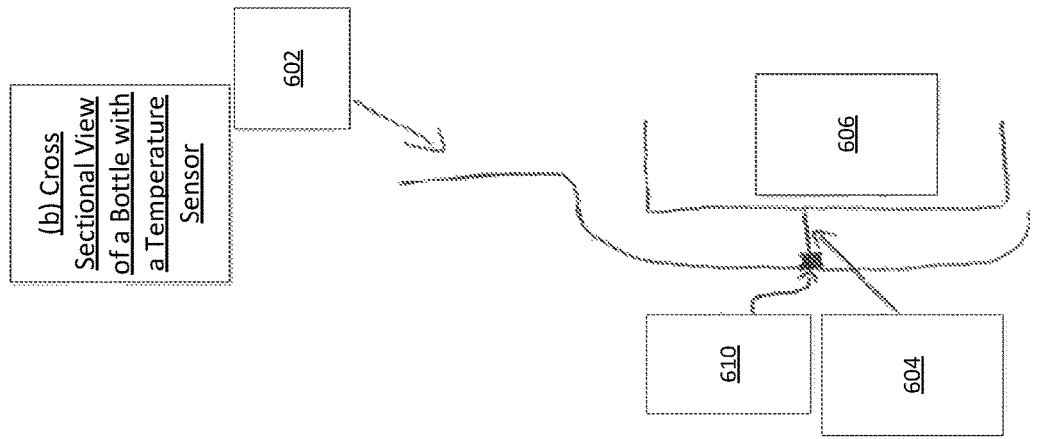
(b) Cross Sectional View of a Bottle with a Temperature Sensor
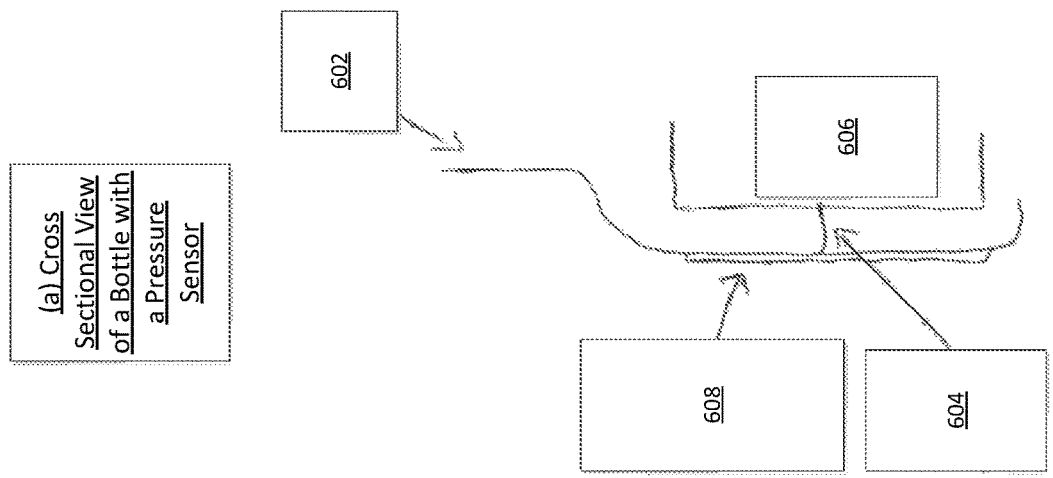
(a) Cross Sectional View of a Bottle with a Pressure Sensor

SYSTEMS, METHODS, DEVICES, AND COMPUTER READABLE MEDIUM FOR REAL AND NEAR-REAL TIME SENSOR DATA CAPTURE AND ANALYSIS

FIELD

Embodiments described herein relate generally to sensors systems for monitoring articles within production, packaging and distribution systems.

INTRODUCTION

Production lines in the agricultural, industrial, and manufacturing markets handling consumer goods (e.g. food, textile, glass) transmit a certain amount of shock, impact, pressure, temperature and other forces to products and related articles as well as subjecting them to various environmental conditions. In automated production lines there is constant effort to increase the speed of automated systems to maximize productivity while minimizing damage and loss of product. Additionally, there is an increased focus on environmental sustainability that may manifest itself in an efficient use of raw materials that are required to facilitate the production of goods in the agricultural, industrial and manufacturing markets including energy sources and product packaging materials, such as, for example, glass, plastic, and aluminum.

Production systems may include continuously or intermittently moving conveyance systems and heavy pieces of equipment through which the goods move. Examples include conveyor belts, air-float systems, accumulation tables, articulated arms, and so on. Due to the nature of these production systems, it may be difficult to get feedback from all parts of the production lines to monitor handling of goods, e.g. to monitor if the goods are being handled beyond their ability to withstand damage, which may result in increased costs of processing and lost revenue.

Product damage may be of particular concern in the following areas:

Agricultural production—mishandling of the product by automated systems can lead to bruising of the product, reducing the price that can be obtained for the product or making it unsellable.

Egg facilities—both in the hatching and in the food-egg industry, mishandling of the eggs can cause damage such as outright breakage or micro-fracturing, which can lead to delayed failure or shelf-life problems.

Glass handling—mishandling of glass containers can lead to failure in the form of shattering or even explosion. Also, multiple sub-damage-threshold force events can lead to micro-fractures which can lead to delayed failure (particularly dangerous if the failure happens in the consumer's hands) or failure at a location other than the point of the force event—for example, failure due to thermal or barometric stress after the bottle has been previously damaged on another part of the line.

Canning—due to the way cans are handled, they may go inside high temperature and high pressure equipment for extended periods of time, making it extremely difficult to visually ascertain where damage is occurring, making equipment repair very time-consuming and expensive.

Pharmaceuticals—many pharmaceutical goods use glass. It is particularly dangerous if these goods are in the consumers' hands in a damaged state that is not apparent in a visual examination. Pharmaceuticals can also be extremely expensive, making reduction in damage and loss of product highly desirable.

SUMMARY

In an aspect, embodiments described herein may provide an integrated sensor system for monitoring, capturing, processing and analyzing data and feedback for delicate and fragile articles in real or near-real time movement within production, packaging and distribution systems.

In another aspect, embodiments described herein may provide an integrated sensor system with:

A sensor platform that contains multiple on-board sensors detecting numerous force, environmental and movement variables such as acceleration in three axis measured at three different vertical positions on the sensor unit, pressure applied to the top of the bottle, sidewall pressure, jarring or collisions of the bottle (closely associated with the acceleration values), temperature, rotation, ambient light, humidity, position and other values.

A handheld data receiver application in communication with said sensor module for issuing commands and processing captured data in real time for immediate reporting on said module and for communication to a web server application for submission of collected data for further data analysis A web server application that is configured to receive information from one or more handheld data receiver applications and perform operations comprising sensor data review, sensor administration and configuration, handheld data receiver application administration and configuration, system administration and data reporting and analytics.

Various example embodiments and features are described herein.

BRIEF DESCRIPTION OF THE DRAWINGS

FIGS. 5, 6 and 7. comprise views (a), (b) and (c), showing top side, side sectional, and front sectional views of three sensors laid out in series on circuit boards according to some embodiments.

DESCRIPTION OF VARIOUS EMBODIMENTS

Figure 1:
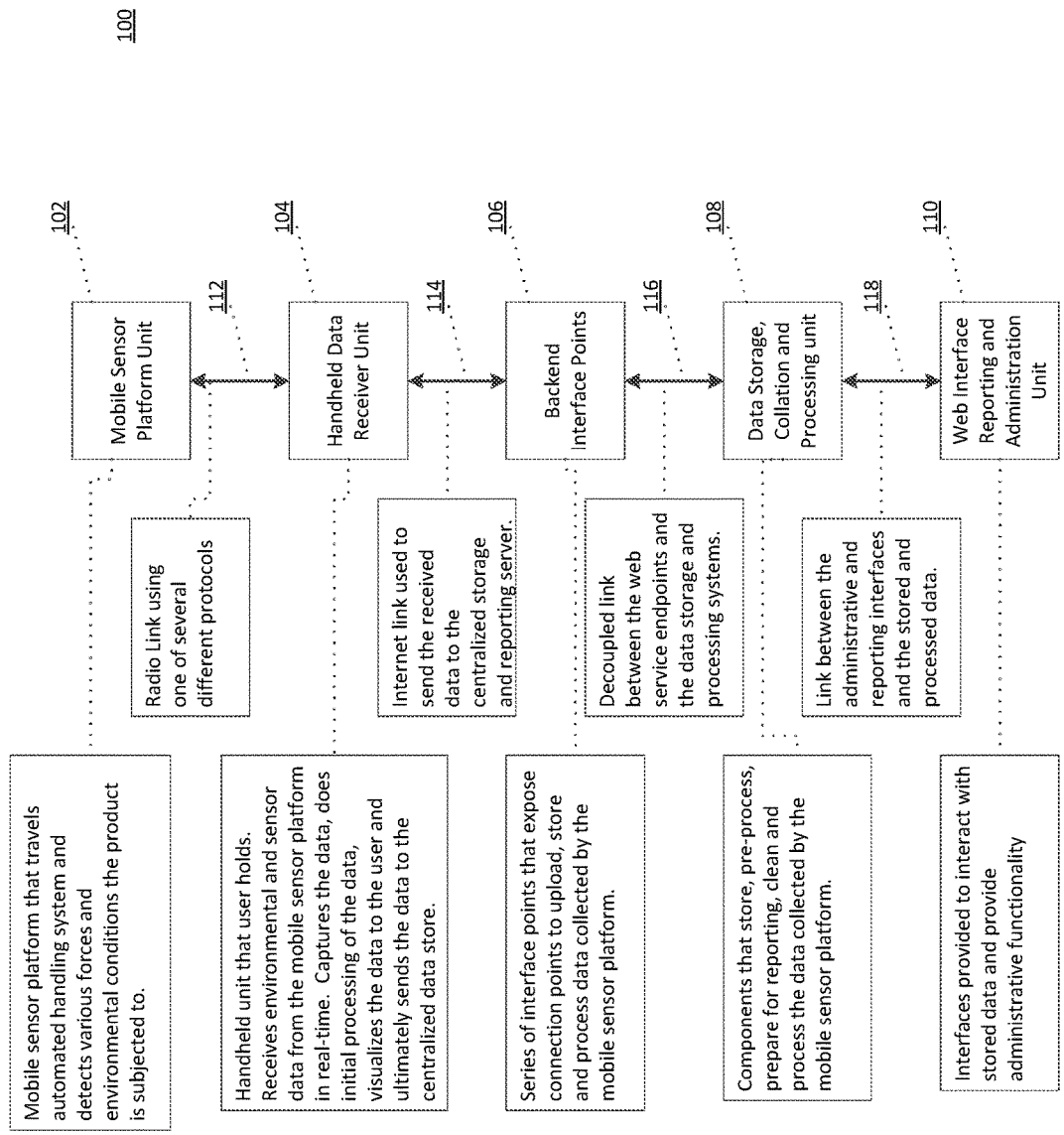
FIG. 1. is a schematic diagram of a system for real time sensor data capture and data analysis according to some embodiments.

Automated production, packaging and distribution systems may cause product damage. There may be mechanisms used to try to reduce damage to the goods on the production line in different situations or industries including agricultural production, egg facilities, glass handling, canning pharmaceuticals, and so on.

Embodiments described herein may provide systems, methods, devices and computer readable medium for real and near-real time sensor data capture, feedback and analysis on aspects of automated production, packaging and distribution systems. This may include analysis processing using and based on measurements of acceleration, velocity, absolute and relative position, impact, force, temperature, pressure, humidity, light and rotation of delicate and fragile articles in production and transportation handling scenarios. These are example measurements for illustrative purposes.

Embodiments described herein relate to real and near-real time sensor systems for monitoring delicate and fragile articles within production, packaging and distribution systems in a state of real or near-real time sensor data capture and feedback which may reduce product damage. Embodiments described herein relate to systems and methods for obtaining accurate, real time or near real time data and feedback, and transforming such data into various usable forms for analysis, such as improvements within operational processes to assist in reducing material waste and energy consumption, product loss, liability reduction and the associated environmental impact. The monitoring and data collection may be in real and near-real time in view of data transmission delays and skew or lag time for data recordation.

By way of illustrative example, in an automated production line, multiple variables may be measured in an effort to reduce damage on the line, which may include some or all of the following:

Line Speed: One such method is the measurement of line speed. Glass containers may be rated to withstand a certain line speed (e.g. may be measured in inches-per-second—IPS, or centimeters per second—CPS) and the line is calibrated to not exceed that speed. However, many factors could lead to glass containers exceeding that speed. For example, when multiple containers suddenly stop, there can be an "impact wave" that can result in some containers "bouncing off" the containers in front of them and striking the containers behind them. This can result in velocities exceeding the line speeds. Other pieces of equipment may move the containers in a manner not directly related to the conveyor belt and, as such, are often overlooked for calibration to limit speed. For example, bottle rinsers often raise the bottle and invert it. This motion can be very fast and may result in damagingly high speeds. Also, a production line is made up of many individual conveyance systems, each of which must be calibrated to the appropriate speed. As well, the various methods used to measure line speed are susceptible to equipment slippage or mis-calibration, giving inaccurate measurements.

Vibration Sensors: Vibrations sensors can be permanently (or semi-permanently) affixed to the line equipment. However, they are generally used to detect vibration within the handling equipment to limit wear and tear on the handling equipment itself, not on the product being handled.

Damage Analysis: Damaged product can also be analyzed to try to determine the type of damage and the forces involved. This can be quite time consuming, especially in the case of glass, as the entire container may need to be reassembled. It is also a reactive measure and offers no capability as a preventative measure. Typically this is done in a lab environment by specialized personnel. This type of damage may only be analyzed by glass manufacturers or engineering firms, making it a time consuming and possibly expensive process.

Particularly troublesome is when forces occur that are below the rated threshold of the containers but occur multiple times to the same container. Over time the container can develop invisible micro-fractures. These micro-fractures can lead to delayed failure of the container, typically when subjected to another type of force such as thermal shock, barometric pressure differences or external pressure. With respect to external pressure, the product is often subjected to continuous pressure from a source external to itself. This typically takes the form of the product on the same handling line being pressed against the product in front of it. It could also be due to a narrowing of the conveyance system at the entrance to another part of the line. This may lead to the product being "squeezed" together. It may be caused in the agricultural industry when the product is stored in silos or any other "piling up" of the product. The product on top presses on the product below. This external pressure is generally longer term then an impact force, but similarly can cause bruising in agricultural products and breakage or crushing in manufactured products. There are many variables that can contribute to external pressure including such things as line speed, lubrication used, stacking heights, etc.

In an example best-case scenario, the failure of a container may occur on the production line. If failure of the container is delayed, diagnosis of the impact may be difficult. For example, line technicians may examine the part of the line where the container failure occurred or is detected, not realizing the damage occurred elsewhere on the line. In an example worst-case scenario, the failure may occur while the product is in transit or when the consumer is handling the product. This may lead to litigation due to injury.

Technologies, which may be referred to as 'data loggers' or 'impact recording devices (IRDs), enable the collection of data. These systems are capable of autonomously recording shocks, vibrations or temperature over a period of time. They gather data on acceleration, time, shock, vibration and temperature which can be retrieved and evaluated after it has been recorded. These devices are relatively cost effective, but they do not provide real time feedback on the collected data to enable the user to accurately pinpoint immediately where the forces occurred in the manufacturing process. Typically they require the user to employ a time-based approach, with a stopwatch, to locate recorded events. This can be complicated by the fact that modern automated handling lines often automatically change speeds and can therefore affect the location of the device at various times. This may require the user of the system to keep a careful time/location log during each test. This may create the possibility of data collection errors and significantly complicate the locating of significant recorded events. These systems typically do not have an online data repository and reporting application system to allow access to information from any location with Internet availability to allow enterprise-wide diagnostics and reporting. Also, the data loggers and IRDs may be extremely limited in the types of available reporting and the flexibility of additional reporting analysis. One of the limitations currently faced by the current 'data logger' technology is that information is stored only at a single server or single site and is difficult, if not impossible, to access for data mining and operational analysis across a large scale or timeframe. This limitation could have negative ramifications for the ability of a company with a large and diversified supply chain to react quickly to manufacturing issues.

Systems may also not address container pressure, top load pressure, rotational spin or external pressure with a real time movement data capture system. Systems may not have an onboard location tracking abilities to determine the location of the product in the manufacturing process.

System equipment may require large capital investments that have a significant plant footprint or require that the product be tested in highly specialized laboratories off-site. System equipment may also be intended to complement and expand existing production line facilities. They may consist of pieces of equipment placed in fixed positions in the production line to provide quality assurance functionality around volume, fill levels, internal pressure, container sanitation, and label positioning. The underlying technologies that form the basis of these equipment pieces may include machine vision systems, x-ray inspection, various sensors for proximity, acoustics, force and torque, load cells, and camera inspection.

These types of systems may not focus on assessing the structural strength of the container or goods or the forces exerted on the container or goods, while moving in real time in the production line through the entire line to the packing stage. A system component may provide a snapshot of one moment in time on the production line but may not accurately measure the performance of the manufacturing process as a whole.

Regardless of the methods used to measure forces on the production line equipment, the devices may not measure forces exerted directly on the products being handled. The devices may also not indicate the exact position where the forces were exerted on the product, especially in a real-time manner. The devices also must be installed on the line in advance, connected to power and possibly data lines by qualified technicians, and the devices may not be mobile.

Consequentially, a challenge with some technologies is the inability to provide real or near-real time sensor data capture capabilities. There may also be the inability to process such data into various usable forms in order to allow problem root cause analysis, predictive modeling, and continuous improvement for operational process and to assist in obtaining efficiencies, including reducing material and energy consumption and the associated environmental impact. Other challenges also exist.

Embodiments described herein may provide, in an aspect, devices, systems, and methods for sensor data capture, feedback and processing in real or near real-time. For example, according to some embodiments, there is provided a device, system and method for collecting in-line real or near real-time movement data that is accurate. An example device may be cost effective and reports the collected data immediately (e.g. real-time, or near-real-time) to the operator to ease identifying the location of problem areas. Another example system enables the collection of operational data efficiently, such that the data can be analyzed for the purpose of optimizing the production process via data driven decision making and such that the data can be transmitted to plant operations monitoring software. These are illustrative examples of aspects of some embodiments described herein.

Embodiments described herein may not be limited in application to the details of construction and to the arrangements of the components set forth in the following description or illustrated in the drawings. Other embodiments are capable of being practiced and carried out in various ways. Also, it is to be understood that the phraseology and terminology employed herein are for the purpose of description and should not be regarded as limiting.

Embodiments described herein may provide systems, methods, devices and computer readable medium for real and near-real time sensor data capture and analysis, including analysis processing for acceleration, velocity, absolute and relative position, impact, force, temperature, pressure, and rotation of delicate and fragile articles in production and transportation handling scenarios. Example sensor data include humidity, luminous intensity, internal and external pressure, and so on. Other examples are described herein.

Embodiments described herein may provide devices, systems and methods that may provide added value information to the user in a converted, correlated, interpreted and fused form (whether by formula, derived correlation or other method). This may be different than the form or units in which the information is measured in the sensor device.

Embodiments described herein may not only present the user of the mobile handheld device with the raw sensor data that was measured, but can also present the user with derivative values which have been determined based on the measured values. Derivative values can be determined formulaically, as in the conversion from acceleration to velocity, or via correlation, as in the conversion to IPS/CPS/Joules from g's of impact, or via fusion of sensor information from various sources in order to generate some relevant information about an event which is not directly measured (e.g. pinpointed location of impact on a bottle, or magnitude of impact on a 1-10 scale).

Embodiments described herein may provide devices, systems, and methods that may be easily portable between pieces of equipment or any location where product handling of any form is taking place without rewiring or other technical assistance.

Embodiments described herein may provide devices, systems, and methods that may provide a reasonable facsimile of the goods being handled to more accurately reflect forces applied to the goods and allow for a system to undergo sections of the automated handling to measure forces applied.

Embodiments described herein may provide devices, systems, and methods that may be able to measure multiple forces being placed upon the goods being handled, not only the forces on the line equipment.

Embodiments described herein may provide devices, systems, and methods that may offer and transmit real or near real time feedback to an operator's device to localize problem areas quickly.

Embodiments described herein may provide devices, systems, and methods that may be repeatable and provide accurate and calibrated measurements.

Embodiments described herein may provide improved sensor-based devices, systems and methods for obtaining accurate, real or near-real time movement data capturing, for transforming such data into various usable forms for analysis, predictive modeling, and for improving operational processes to assist in obtaining efficiencies including reducing material and energy consumption and the associated environmental impact.

Embodiments described herein may provide a production, packing, and distribution real or near-real time movement, environmental and force data capture and analysis system. Environmental data may include, for example, temperature, humidity, light, among other data.

Embodiments described herein may provide methods for obtaining accurate, repeatable, real or near-real time movement, environmental and force data capture and reprocessing such data into various usable forms for analysis, predictive modeling, trend analysis, and continuous improvement purposes within the operational process to assist in obtaining efficiencies including reducing material waste and energy consumption and the associated environmental impact.

Embodiments described herein may provide such data via a web-based platform for easy dissemination via web and mobile platforms.

Embodiments described herein may offer a cost effective, non-invasive, portable, and efficient quality assurance and root cause sensor system that moves through the actual production, packaging and distribution systems, simulating the product under test, reporting real or near-real time data on forces, movement, environmental factors and potential damage incidents to both on-site wireless device applications and web based data aggregation and reporting systems.

Embodiments described herein may provide a simulation of the product under test (e.g. a simulation replica of a production line article) to monitor and process sensor data associated therewith.

Embodiments described herein may provide a real or near-real time force, environmental and movement based data capture, feedback, and reporting system with the current reporting capabilities, flexibility, and real or near-real time functionality. Example environmental factors include temperature, humidity, light, and so on. These environmental factors may be different than contact force or stress factors.

Embodiments described herein may provide an integrated sensor system, and may facilitate real or near-real time movement data capture by creating a simulation replica of a production line article that contains sensor technology. This simulation replica can be placed anywhere on the production facility's lines without interruption or shut down. The simulation device moves throughout the production process as a regular product article does, mimicking movements and capturing data throughout the supply chain system. Data is transmitted instantly (e.g. real-time or near-real-time) to a wireless device application on-site, and web based data aggregation and reporting systems. The captured and processed data can be reviewed and monitored from anywhere in the world with Internet access.

Embodiments described herein may provide an integrated system that captures acceleration, velocity, absolute and relative position, rotation, impact, force, temperature, and pressure in manufacturing, processing and handling facilities. The devices may relay the captured data to a wireless device application that records and reports the data in real or near-real time and transmits it to a web server application for enhanced and detailed reporting and analysis. Embodiments described herein may provide a product that includes real or near-real time movement and impact data, internal pressure, sidewall pressure, top load pressure, external temperature, rotational spin and location with the ability to add other sensor types modularly.

In an aspect, embodiments described herein may provide a method that involves (a) viewing real or near-real time movement, environmental and force data for operational analysis in a production, packaging or distribution environment and (b) transmitting this data to at least one wireless device thereby providing real or near-real time viewing of measured forces to the operator in a graphical fashion and (c) transmitting this same or a version of the data to at least one web server application that is linked to one or more applications for providing reporting on events experienced throughout the supply chain system.

In another aspect, embodiments described herein may provide a system that enables the gathering of operational data from one or more manufacturing facilities via a web based client portal, and makes the data accessible to one or more groups of stakeholders which may include glass manufacturers, global centers of excellence for various forms of fragile goods (food, glass, pharmaceutical, health and beauty, seafood, etc.), equipment manufacturers, and others, in order to provide analytics for performance factors that impact the businesses. These performance factors include, but are not limited to, integrity of glass produced, changes to glass composition or glass coatings, introductions of or adjustments to machinery in a facility that effect the integrity of the products (glass, aluminum, food products), comparative quality assurance data among manufacturing facilities, best practice usages by facility, troubleshooting glass issues by their manufacturers, and so on.

In another aspect, embodiments described herein may provide a collection of real or near-real time movement, environmental and force data over time to enable predictive modeling on fragile goods. This data can be collected, analyzed and used for future developments in the aforementioned industries.

Data can be provided to various plant management systems for integration with human machine integration (HMI) systems or integration with predictive and/or modelling software systems, such as various integrated plant intelligence systems.

Various embodiments of the invention may include a simulation device that addresses shock and impact levels, vertical load impact, rotation, temperature, humidity, ambient light, absolute and relative location, and internal and external pressure in glass bottles and food and beverage cans. Embodiments may also provide a simulation device that detects spot and shatter bruising in potatoes, apples and other produce. Embodiments may also provide a simulation device that detects checks, cracks and hairline damage in laying and hatching eggs. Embodiments may also provide a simulation device that measures and transmits various types of data, including shock levels, top load pressure, container pressure, temperature, rotational spin, humidity, ambient light, and may be equipped with a location tracking system to enable users to pinpoint its location in the process.

Referring now to FIG. 1, there is shown a schematic diagram of a system 100 for real or near-real time sensor data capture and analysis according to some embodiments.

The system 100 may be used to monitor, process, analyze and subsequently review all of the data relating to forces and conditions applied to an object under test. These forces and conditions may include acceleration, velocity, impact, force, temperature, pressure, rotation, and the location of delicate and fragile objects in scenarios involving production and transportation, among others.

The system 100 comprises a mobile sensor platform unit 102; a handheld data receiver unit 104; one or more backend interface points 106; a data storage, collation and processing unit 108; and a web interface reporting and administration unit 110. The backend interface points 106, the data storage, collation and processing unit 108, and the web interface reporting and administration unit 110 are collectively referred to as the backend processor.

Figure 9:
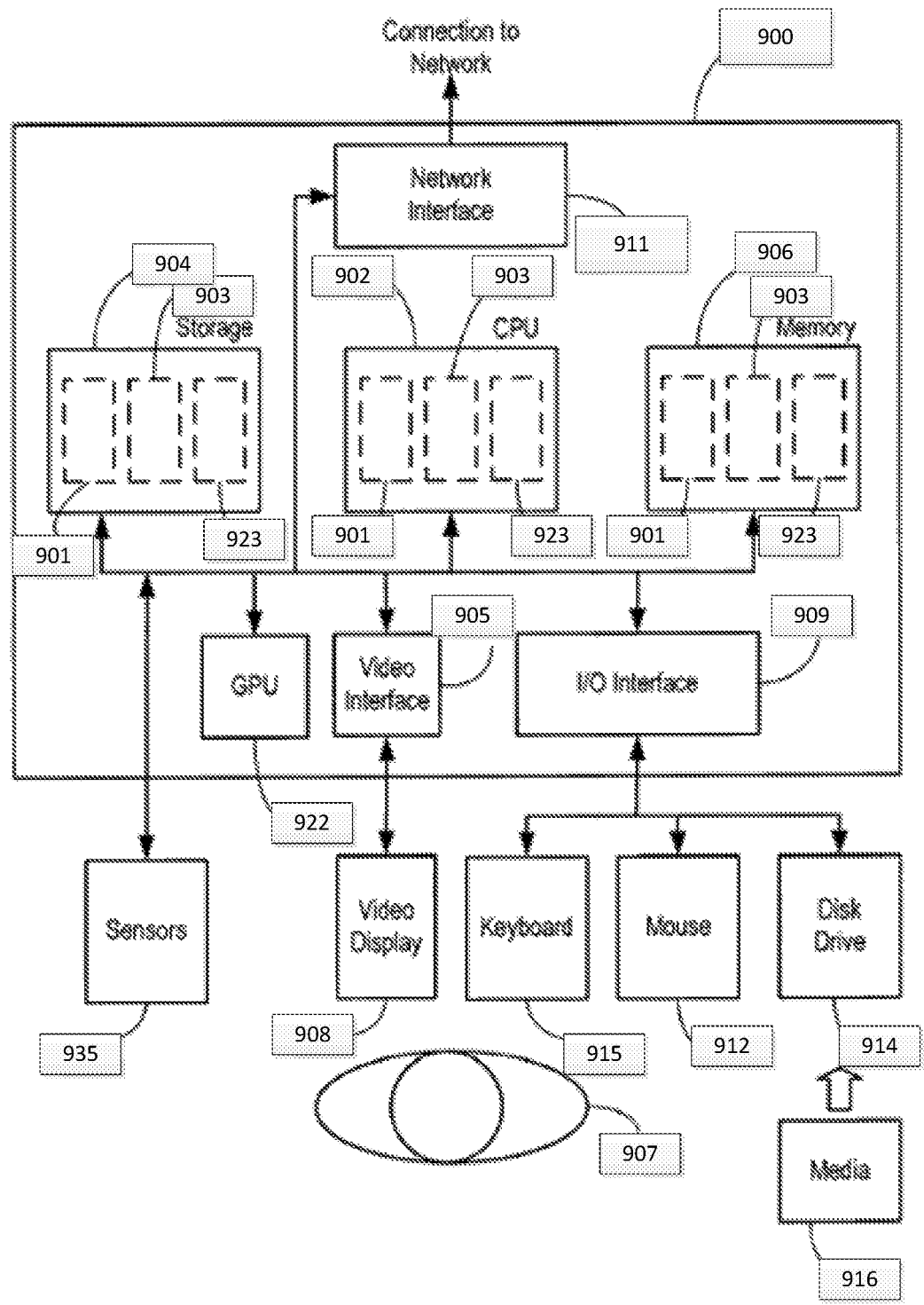
FIG. 9. comprises views (a), (b), (c) and (d), showing the mobile sensor platform of FIG. 2. contained (a) within a can, (b) a long-necked bottle, (c) a short-necked bottle and (d) an egg according to some embodiments.

In some embodiments, the mobile sensor platform unit 102 is mounted and housed in a replica fragile and delicate object in the approximate configuration and weight of objects regularly involved in scenarios where the objects could sustain damage (See FIGS. 9 (a)(b)(c)(d)).

The mobile sensor platform unit 102 communicates with the handheld data receiver unit 104 using a radio link 112. The radio link 112 may be established using several different protocols. The handheld data receiver unit 104 is connected with one or more backend interface points 106 using an Internet link 114. The one or more backend interface points 106 communicate with the data storage, collation and processing unit 108 through a decoupled link 116.

In alternate embodiments, decoupled link 116 may instead be a wired connection, such as a universal serial bus interface, a Firewire cable, etc. In such an embodiment, the two ends of the communications layer may not require direct knowledge about each other at build time. The communications layer may change without rebuilding the software. The communications components may be computed at run-time.

The decoupled link 116 provides communications between one or more endpoints which may use one or more different technologies to communicate. An appropriate communications protocol provider may be utilized at run-time at each endpoint. For example, a TCP connection component, or a UDP component, or HTTPS/SSL or IPv6 vs. IPv4, USB or serial communications means may be used without rebuilding the software. A dependency resolution manager system 412 may be utilized to look up which communications components to use at run-time.

The data storage, collation and processing unit 108 communicates with the web interface reporting and administration unit 110 using a link 118. The data storage, collation and processing unit 108 may be configured to store collected data and also may be configured to pre-process data during, and immediately after, data collection and transmission to the backend interfaces 106.

The administration unit 110 is configured to provide an interface to be used by users and administrators to manipulate and report on the collected data. Link 118 is the mechanism by which the collected data is made available to these user and administrative tools. Link 118 may be implemented using a variety of technologies, which may include, but are not limited to, remote procedure calling (RPC), web services, Representational state transfer (RESTful) services or other such techniques.

We will examine each section of system 100 in more detail, but as a general overview, as can be seen, the data captured by the mobile sensor platform unit 102 is sent through the radio link 112 to the handheld receiver 104 for visualizing by the end user. The handheld receiver 104 is also the means by which control and configuration commands are communicated to the mobile sensor platform unit 102 through the radio link 112.

The handheld data receiver 104 communicates the captured data to the backend interface points 106 through the internet link 114. The backend interface points 106 are a series of interface points that expose connection points to upload, store and process data captured by the mobile sensor platform unit 102.

The backend interface points 106 communicate with the data storage, collation and processing unit 108 through the decoupled link 116 to store, pre-process, prepare for reporting, clean and process the data collected by the mobile sensor platform 102.

Figure 10:
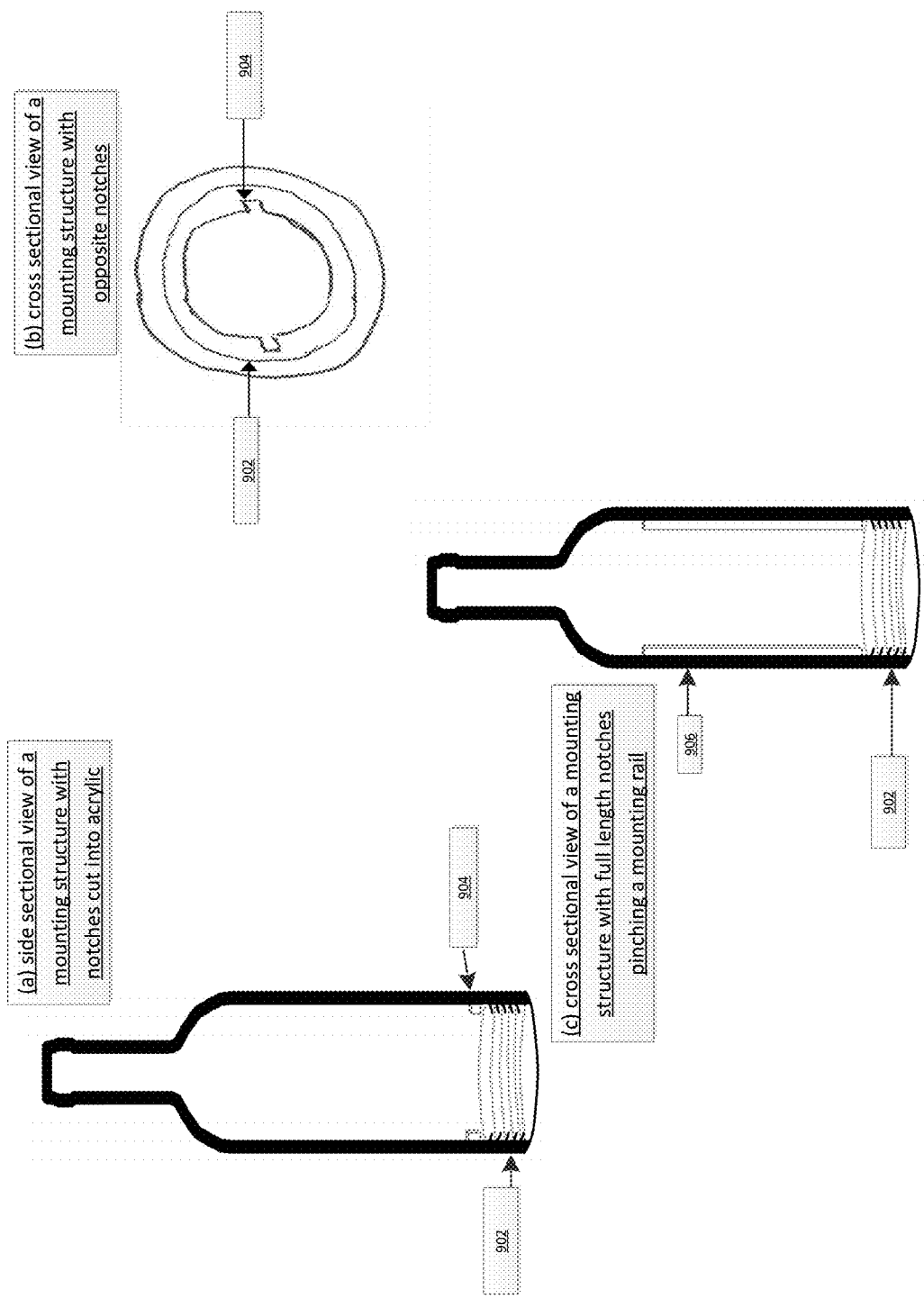
FIG. 10. comprises views (a), (b) and (c), (a) being a side sectional view of a mounting structure with notches cut into acrylic, (b) being a cross sectional view of a mounting structure with opposite notches, and (c) being a cross sectional view of a mounting structure with full length notches pinching a mounting rail.

The web interface reporting and administration unit 110 may be used to communicate and to interact with stored data via the data storage, collation and processing unit 108 and may provide administrative functionality. In some embodiments, the mobile sensor platform unit 102 is securely mounted to provide accurate acceleration and force measurement data within an acceptable range of statistical volatility. A secure mounting structure could, for example, utilize a series of threads 902 and a plurality of notches 904 cut into an object. In another example, a plurality of full length notches 906 could be used to pinch a mounting rail. Views of the above example configurations are depicted in FIGS. 10 (a), (b) and (c).

Mobile Sensor Platform Unit

Figure 2:
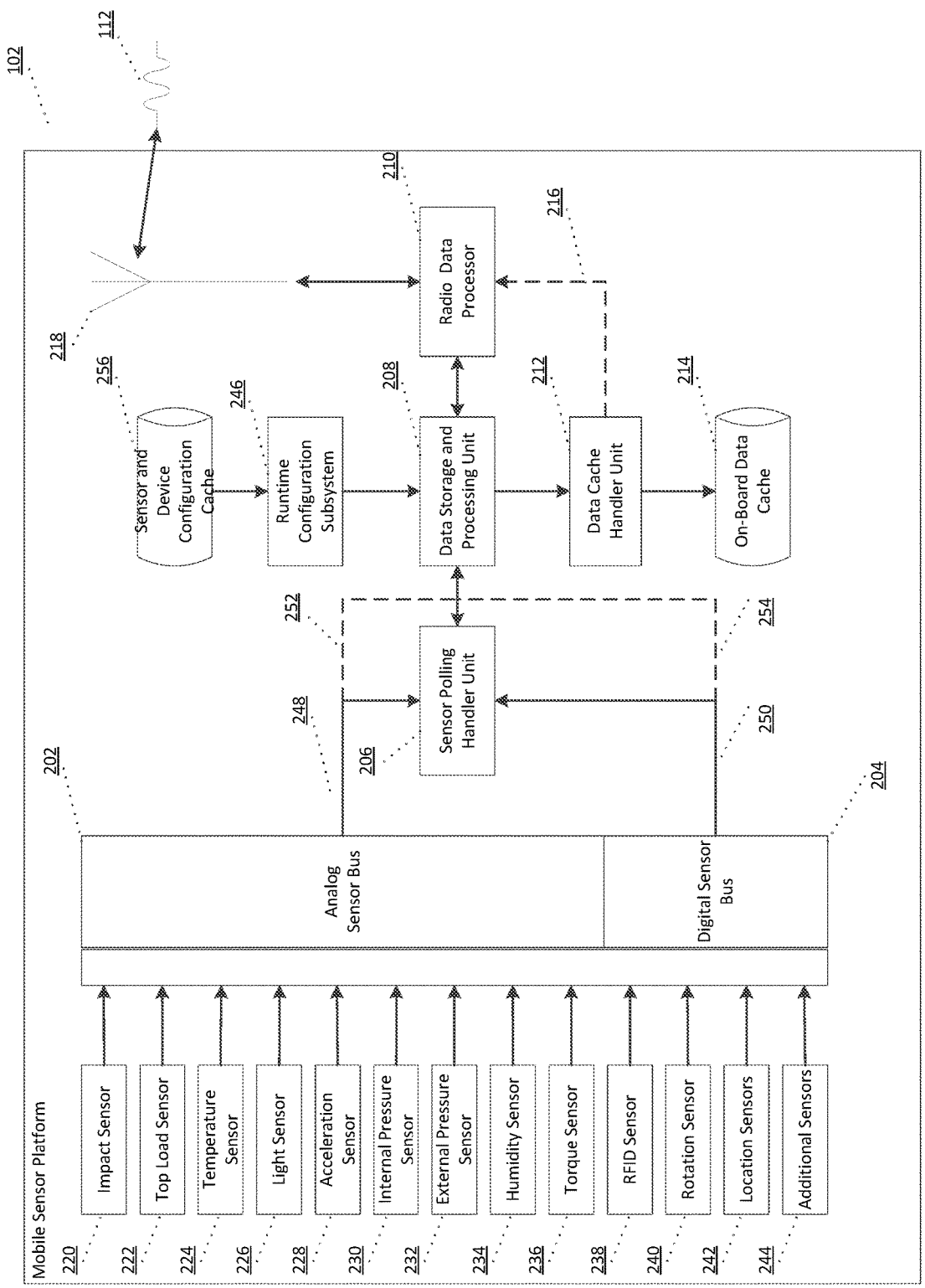
FIG. 2. is a schematic diagram of the mobile sensor platform unit shown in FIG. 1, according to some embodiments.

Referring to FIG. 2, the mobile sensor platform unit 102 may comprise of one or more analog sensors, one or more digital sensors, an analog sensor bus 202, a digital sensor bus 204, a sensor polling handler unit 206, a data storage and processing unit 208, a radio data processor 210, a data cache handler unit 212, an on-board data cache 214, and a runtime configuration subsystem 246. In the diagram, the sensors 220-236 are shown connected to the analog sensor bus 202 and sensors 238-244 are shown connected to the digital sensor bus 204. This is provided for non-limiting, illustrative purposes only. A number of these sensors may be available in both analog and digital implementations, and depending on the embodiment of the invention, the invention may be comprised of various combinations and permutations of these sensors. The sensors can be connected to the appropriate sensor bus as required.

Examining the mobile sensor platform unit 102 in more detail, the sensors 220-236 (again, while these sensors are typically analog in nature, digital variations may also be used) may comprise of an impact sensor 220, a top load sensor 222, a temperature sensor 224, a light sensor 226, an acceleration sensor 228, an internal pressure sensor 230, and an external pressure sensor 232, a humidity sensor 234, a torque sensor 236 among others. Sensors can be either analog or digital and the circuit may have both a digital and analog bus and can support any mix of sensors and the appropriate bus interface.

In some embodiments, the impact sensor 220 is able to detect various impact forces applied against the model. In some embodiments where the object would experience repeat impacts, the impact sensor 220 is able to capture the number of impacts correctly.

In some embodiments, the top load sensor 222 is able to detect any vertical load or pressure applied to the model. Such a sensor may be commonly used for detecting forces during capping, filling or sealing of the container.

In some embodiments, the temperature sensor 224 may be able to detect ambient temperature in the environment external to the model as well as the temperature within the model. Temperature may be a critical consideration in many food handling scenarios.

In some embodiments, the light sensor 226 may be able to detect ambient light in the environment external to the model. Light can be damaging to certain products.

In some embodiments, the acceleration sensor 228 may be able to detect acceleration of the model being tested due to line speed changes, direction changes, etc.

In some embodiments, the internal pressure sensor 230 may be able to detect internal air pressure within the vessel. This is commonly used for measuring carbonation levels, proper sealing of the container, etc.

In some embodiments, a magnetometer sensor 244 is able to detect magnetic fields and assist in location and orientation determination.

In some embodiments, the location sensor mechanism of 242 may be able to determine absolute or relative position of the model being tested by means of Bluetooth Low Energy beacon, RFID recognition, triangulation of radio signals, RFID recognition, dead reckoning, altimeters, or other methods.

In some embodiments, the external pressure sensor 232 may be able to detect sidewall pressure. The internal pressure sensor 230 is for measuring internal fluid pressure in the vessel (e.g. air pressure, fluid pressure, and so on). The top pressure is detected by the top-load sensor 222.

In some embodiments, the humidity sensor 234 may be able to detect ambient humidity in the environment external to the model.

In some embodiments, the torque sensor 236 may be able to detect torque applied to specific parts of the model. This is commonly required for detecting torque used to seal a container via various sealing methods.

In some embodiments, the one or more acceleration sensors of 228, sampled at an appropriate sampling rate, are used to capture the entire acceleration waveform to accurately measure the acceleration profile and from that determine accurate velocity changes.

In some embodiments, the one or more acceleration sensors of 228 include a tri-axial accelerometer containing multiple on-board sensors detecting multiple environmental variables such as acceleration in all 3 axes, measured at two different vertical positions on the sensor unit, jarring or collisions of the object. In some embodiments, the one or more acceleration sensors of 228 will be made up of multiple one-axis or two-axis accelerometers with device logic used to combine the inputs into a tri-axial measurement value.

The analog sensors send sensor data through the analog sensor bus 202 as analog voltage readings that may be encoded with a device specific encoding.

The analog sensors (which may have digital variants) make their data available to analog signal conditioning circuitry, which converts the data to a voltage level and puts it on the analog sensor bus 202. The voltage data on the analog sensor bus 202 may be encoded with device specific encoding. Typically, individual analog devices do not share a bus but require access to a dedicated analog input on the micro controller. It is also possible to use a multiplexer to share a single analog input with multiple devices.

The digital sensors may be comprised of a radio frequency identification sensor 238, a rotation sensor 240, a location sensor 242, and one or more other additional sensors 244, among others. The digital sensors may send sensor data through the digital sensor bus 204 using standard protocols such as inter-integrated circuit bus (I²C) or serial peripheral interface bus (SPI) to transmit data. These protocols allow multiple devices to share the same data bus. In certain instances, the listed sample digital sensors may also be implemented as analog sensors.

In some embodiments, the sensors are modular and are capable of being easily removed and added by an operator. These sensors may also be moved from one position to another. For example, an operator may decide to remove the location sensor and replace it with a temperature sensor, or decide that the temperature sensor would work better at a different position of the platform and move it accordingly. This functionality is useful for an operator skilled in the art as it may not always be clear without trial and error which permutations or configurations of sensors operate more accurately than others.

The sensors and their descriptions are provided for non-limiting illustrative purposes only. Sensors may be implemented in various configurations as analog devices, digital devices or devices with both analog and digital components. For example, some sensors may be available both as digital and analog sensors—a designer would be able to select which sensor type is preferable for the given application.

In some embodiments, the one or more acceleration sensors 228 may be sampled at an appropriate sampling rate, and the one or more acceleration sensors 228 may be used to capture the entire or a substantial part of acceleration waveform to measure the acceleration profile and at least from that, determine velocity changes. The accurate conversion from one value to another, such as, acceleration to velocity, may be advantageous depending on the application of the system.

In some embodiments, the one or more acceleration sensors 228 include a tri-axial accelerometer containing multiple on-board sensors detecting multiple environmental variables such as acceleration in all 3 axes measured at three different vertical positions on the sensor unit, or jarring or collisions of the object. In some embodiments, the one or more acceleration sensors 228 may be comprised of one or more one-axis or two-axis accelerometers with device logic used to combine the inputs into a tri-axial measurement value.

Each sensor type may be calibrated, and calibration may be different depending on the particular sensor, the particular configuration of that sensor, the use of the sensor, among other reasons. For example, the accelerometers are calibrated each time a data acquisition run is started by detecting the orientation of the model and the "zero levels" of the accelerometer. For example, if the model is in an upright position the accelerometers will detect a 1G acceleration in the direction of gravity. This reading may require to be "zeroed out". Slight variations between sensors may also be corrected, even of the same type, by putting the device through a calibration process, applying a known force against the device, recording the measured results and applying any corrective value necessary to ensure reported value is the same as known applied value. This latter calibration may typically be done in a lab environment.

The analog sensor bus 202 and the digital sensor bus 204 are connected to the sensor polling handler unit 206 and connected directly to the data storage and processing unit 208. In some cases, the sensor polling handler unit 206 is configured for reading sensor values periodically via links to the appropriate sensor bus, 248 and 250, and monitoring for significant data, typically defined as data exceeding a defined range within which the data is deemed irrelevant based on configurable parameters to the container or product under test, which would then be passed on to the data storage and processing unit 208. The configurable parameters may include, for example, a configurable defined range. The sensor polling handler unit 206 can monitor different sensors at different frequencies depending on the characteristics of the sensor and force being measured. For example, impact data requires a very high sampling frequency due to the nature of the acceleration event. Temperature data, however, can be monitored at a significantly lower frequency due to the nature of the change in temperature of the surrounding medium (air or water for example). Some cases, the sensors may update the data storage and processing unit, 208, directly via a second set of direct linkages, 252, 254. Some sensors may be triggered only when certain force thresholds are reached. In these cases, the polling mechanism may be bypassed.

The dashed lines are provided to illustrate the links that may occur directly between the buses to the data storage and processing unit 208.

Optionally, the sensor polling handler unit 206 may be used to periodically sample the analog sensor bus 202 and the digital sensor bus 204 to determine if new significant captured data exists. In some embodiments of the invention, sensor polling handler unit 206 may be configured to determine if new captured data meets configurable thresholds regarding the significance of the captured data. The sensor polling handler unit 206 may communicate the captured data to the data storage and processing unit 208.

The sensors may also communicate the captured data directly to the data storage and processing unit 208, bypassing the sensor polling handler 206.

The sensor polling handler 206 stores data in the data storage and processing unit 208 and may conduct the initial processing of the captured data. Initial processing of the captured data may include, for example, threshold handling.

The runtime configuration subsystem 246 may communicate with the sensor polling handler 206 to transmit configuration values to determine how frequently the sampling is performed and the specific sampling frequencies for each sensor being monitored. The runtime configuration subsystem 246 may be loaded with configuration data from a file that may be persistently stored in non-volatile memory in the sensor and device configuration cache 256. The data storage and processing unit 208 may be configured to read configuration values from the runtime configuration subsystem 246 at device power-up. When a data run is started via a command received from the radio processor 210, several of these values are merged with values received during this start command. The data storage and processing unit 208 then sends parts of this merged configuration data to the sensor polling handler unit 206. A default configuration may be set when the device is first configured, but the settings may also be configured through the handheld.

The file may be loaded via a standard USB interface when the device is placed into a bootloader mode. The file may contain a series of name-value pairs that correspond to the configurable portions of the mobile sensor platform 102.

Example values that can be configured using the runtime configuration system 246 include attached sensor types, sensor polling frequencies, triggering sensor threshold levels, radio system configuration values and data retention duration.

In some embodiments, the sensor polling handler unit 206 can be configured to sample at a sufficient rate to capture the entirety of a force event occurrence to a delicate and fragile article.

Each sensor type may be calibrated differently. For example, the accelerometers may be calibrated each time a data acquisition run is started by detecting the orientation of the model and the "zero levels" of the accelerometer. For example, if the model is in an upright position the accelerometers will detect a 1G acceleration in the direction of gravity. That needs to be "zeroed out". The system may also correct for slight variations between sensors, even of the same type, by putting the device through a calibration process, applying a known force against the device, recording the measured results and applying any corrective value necessary to ensure reported value is the same as known applied value. This latter calibration may be done in a lab environment before sending unit to customer.

The on-board data cache 214 may be used to cache the captured data for potential replay and to support store-and-forward functionality. Store-and-forward functionality allows for the redundant or delayed transmission of the captured data, which is potentially advantageous in situations where there is low or poor radio connectivity.

In the case of a loss of communications, perhaps due to entering an enclosed piece of equipment, or being submerged under water, the device will store collected data. When wireless communications are restored, then stored data that had not yet been sent may be transmitted/replayed from the cache. The cache can also store the data between device power events in cases where data collection is done without reporting it via the wireless link.

The radio data processor 210 may communicate with both the data storage processing unit 208 and the on-board data cache 214 to send the appropriate data through the radio link 218 to communicate with the handheld receiver unit 104 for real or near-real-time data reporting and visualization. The radio data processor 210 may utilize a suitable wireless communications technologies, such as Wi-Fi, or Bluetooth, Zigbee, or 900 MHz radio system, among others.

In an alternate embodiment, communication with the handheld receiver link 104 may be operable through a wired connection. A person skilled in the art would understand such a wired connection to be any connection standard in wired communications, e.g. a universal serial bus (USB) connection, a serial port connection, or a Firewire cable.

Handheld Receiver Unit

Figure 3:
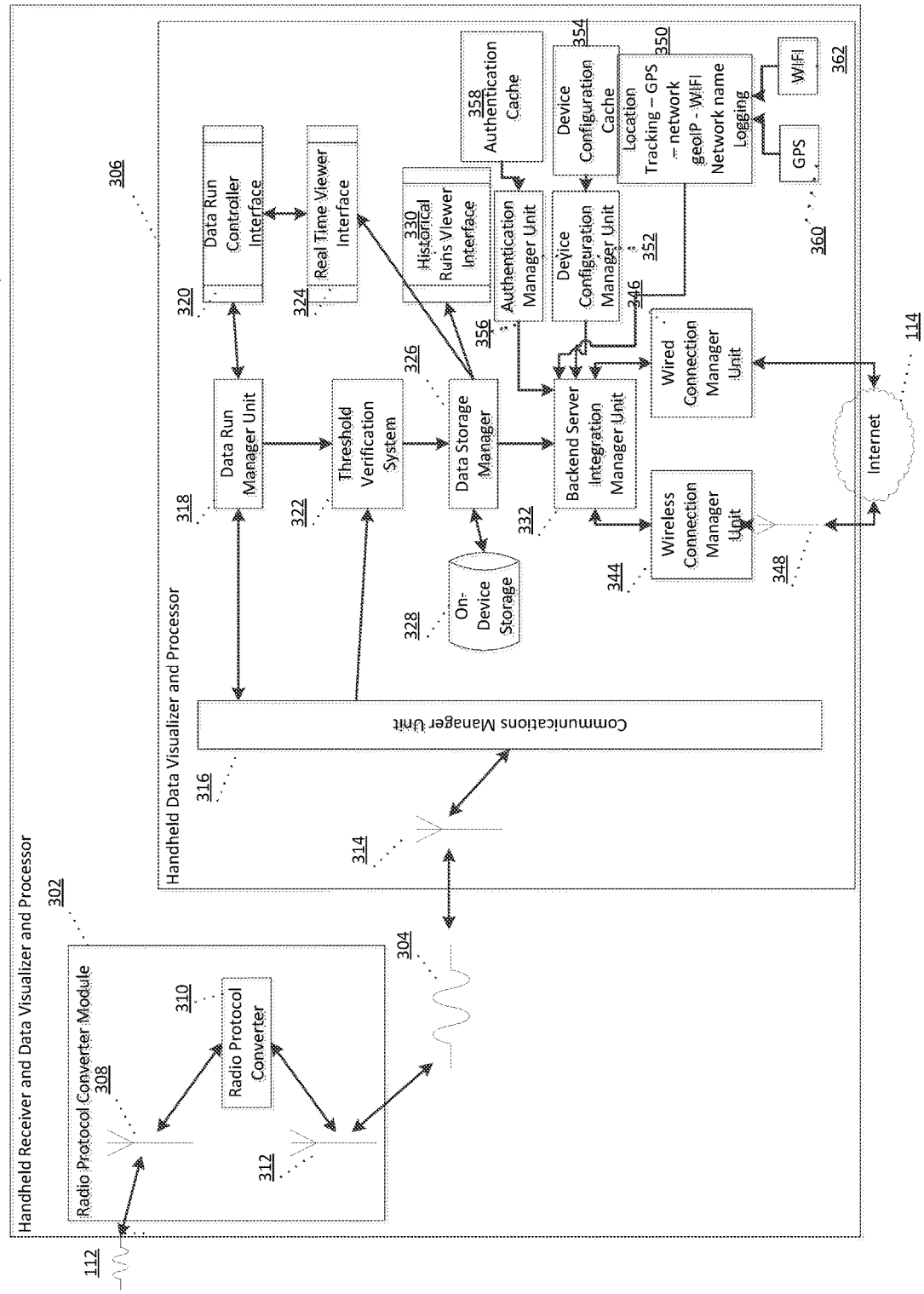
FIG. 3. is a schematic diagram of the handheld data receiver unit shown in FIG. 1, according to some embodiments.

Referring to FIG. 3, the handheld receiver unit 104 may comprise of a radio protocol converter module 302 and a handheld data visualizer and processor 306. The protocol converter module 302 may be bypassed in some cases allowing for direct radio communications 364 between the handheld receiver unit 104 and the mobile sensor platform 102. The handheld receiver unit 104 is connected with the mobile sensor platform unit 102 to issue commands and to process captured data in real or near-real time for immediate reporting and communication to the backend processor for further data analysis through the radio link 112.

In an example according to some embodiments of the system, the handheld data receiver 104 may have memory which interfaces with the system 100 in various ways to execute administrative commands on the system 100, to execute operations on the mobile sensor platform unit 102, to visualize information gathered, to run reports, or to review aggregate information gathered from a variety of sources. For example, there may be a Handheld Data Visualizer and Processor and Radio Protocol Converter Module.

In a further example, a supply chain analyst would be able to use her handheld device to run a mobile application to interact with the sensor platform as a handheld data receiver 104 or as a handheld data visualizer and processor 306. The application could first identify her credentials, and then provide functionality based upon her level of access and permissions. She could, for example, run a report to visualize the pressure being sensed by a replica egg at a particular step in the process, and then compare this report to the pressure logged from the same step at another plant for comparing plant performance.

Examining the handheld receiver unit 104 in more detail, the handheld data visualizer and processor 306 communicates with the mobile sensor platform unit 102 to obtain captured data, processes the data, provides the user with an interface to view and interact with the data, and provides the data through the internet to the backend processes.

The handheld data visualizer and processor 306 may be part of the handheld receiver unit 104, or be a separate device. In some embodiments of the invention, the handheld data visualizer and processor 306 may be a mobile device, such as a laptop, tablet computer, mobile phone, among others.

The radio protocol converter module 302 bi-directionally converts the protocol used by a radio link 308 from the mobile sensor platform unit 102 into the protocol used by a handheld receiver unit radio link 312, using for example, Bluetooth, using a radio protocol converter 310. This allows use of different phone/tablet/laptops for the handheld without changing the radio used by the sensor. It may also allow for change of the sensor radio technology without affecting the phone/tablet/laptop for the handheld. The radio protocol converter module 302 may be bypassed in cases where the mobile sensor platform unit 102 and the handheld receiver unit 104 use the same radio protocol 364. Additionally, the radio protocol converter module 302 may be bypassed in the case where the mobile sensor platform unit 102 transmits data indirectly to the handheld receiver unit tablet via a cellular internet connection, using pathways 366 and 368. As previously mentioned, this protocol converter module is optional in some cases. If the sensor unit uses Bluetooth as its radio link it could connect directly to the phone/tablet/laptop for short range use. Long range use may require this protocol converter in example embodiments.

The sensor platform radio link 308 communicates between the mobile sensor platform 102 and the handheld receiver unit 104 through the handheld receiver unit radio link 312.

The handheld receiver unit radio link 312 communicates through a radio link 304 established between the radio protocol converter module and the handheld data visualizer and processor 306 through a radio receiver unit 314. The radio protocol converter module 302 may be bypassed in cases where the mobile sensor platform unit 102 and the handheld receiver unit 104 use the same radio protocol 364.

The handheld data visualizer and processor 306 may be comprised of a communications manager unit 316, a data run manager unit 318, a data run controller interface 320, a threshold verification system 322, a real time viewer interface 324, a data storage manager 326, on-device storage 328, a historical runs viewer interface 330, a backend server integration manager unit 332, a wireless connection manager unit 344, a wired connection manager unit 346, a wireless radio link 348, a location tracking unit 350, a device configuration manager unit 352, an authentication manager unit 356, and an authentication cache 358.

In some embodiments, the wireless radio link 348 is established through standard wireless network protocols such as 802.11b, g or n.

The communications manager unit 316 manages communications between the handheld receiver unit 104 and the mobile sensor platform unit 102 through the radio receiver unit 314. The communications manager unit 316 bi-directionally communicates with the data run manager unit 318, which manages control of data runs on the handheld and sending control messages to sensor platform.

The data run controller interface 320 provides a screen for the user to control data runs by interfacing the data run manager unit 318. This could include such actions as starting, stopping, suspending and restarting data collection.

The threshold verification system 322 verifies that collected data is within user-configurable significant data threshold levels, stipulating which data is worthy of capture, and receives inputs from the data run manager unit 318 and the communications manager 316.

The data storage manager unit 326 stores the captured data following verification from the threshold verification system 322, and provides the processed data to the real time viewer interface 324, the historical runs viewer interface 330, and the backend server integration manager unit 332. The processed data is also stored on the on-device storage 328.

The real time viewer interface 324 provides the user with a real or near-real time view of the processed data and the historical runs viewer interface 330 provides the user with a view of the processed data collected on previous data runs.

The historical runs viewer interface 330 may also provide the user with the ability to review entire data runs, zoom in on any section of the data run, manipulate the data, select which specific sensors or calculations to display and more.

In some embodiments, the real time viewer interface 324 provides the user with real or near-real time reporting on the mobile sensor platform unit 102 as data is being captured and provides a dynamic display in the form of a shock impact scale or other scale appropriate to the sensor-specific data being captured and processed, such as temperature, pressure, rotation, etc.

In some embodiments, the real time viewer interface 324 provides the user the ability to mark and record the occurrence of a force event that occurs as the mobile sensor platform unit is in a state of real or near-real time force data capture during a production, packing, or distribution process and correlate the event to a physical point of reference within such process.

The backend server integration manager unit 332 synchronizes processed data with the backend processor through either the wireless connection manager unit 344 or the wired connection manager unit 346, which provides wireless and wired Internet connectivity to the handheld receiver unit 104, respectively.

The wireless connection manager unit 344 utilizes the wireless radio link 348 to establish a connection between the handheld and the internet link 114.

The location tracking unit 350 may include a GPS location tracker unit 360 and a wireless location tracker unit 362. The location tracking unit 350 tracks the location of the handheld data receiver unit 104 through using either the GPS location tracker unit 360 or the wireless location tracker unit 362. The location tracking system 350 may be configured to stamp a data run with location info if such data is available. If available, it will use the GPS location tracker 360 to determine location. Many devices do not include such a GPS system and in such cases the system may fall back to determining position via the wireless location tracker unit 362, which may have a variety of implementations. For example, wireless tracking can be as simple as GeoIP determination where the location is determined by the IP address of the network. More complicated implementations can use databases of visible wireless networks to determine locations (Google offers one such database). This location info can be used to correlate a data run with a specific customer plant. This may be potentially useful for clients with multiple manufacturing facilities.

In some embodiments, the GPS location tracker unit 360 and wireless location tracker unit 362 are used together to provide more reliable or accurate location data.

The device configuration manager unit 352 connects with the web interface reporting and administration unit 110 to receive notification of hardware or software errors, receive software updates and upgrades to the handheld data receiver unit applications, configure on board sensors such as sampling frequency and on-board threshold levels and provide wireless configuration administration to the handheld data receiver unit application to allow data communication with the sensor module. The device configuration cache 354 persistently stores the configuration information of the handheld receiver unit 104.

When the user logs in while connected to the Internet all of the client device configuration data for all devices is downloaded to the handheld unit and stored in the configuration cache 354. If a user starts the app while not connected to the Internet or other communication network then the values from the cache are used. When the data run is started a series of commands are sent to the sensor unit made up of values from these cached device configuration details for the particular device they are using. These could include sampling frequency for each on-board sensor, which sensors are activated or not, threshold levels for each sensor, formulas to use to convert collected values to other values (like converting collected acceleration values to velocity or force values), etc.

The authentication manager unit 356 is used for the authentication of account credentials on the handheld receiver 104. A mechanism is in place that may allow the user to authenticate while connected to the network or while not connected. In the case where a network connection is found, then the authentication is conducted against the backend system and device configuration data is refreshed. These credentials may also be cached. In the case where a network connection is not available, the cached credentials can be checked instead, if the user has previously logged in before. An optional countdown feature can be enabled to limit how long the user is allowed to use only cached credentials without authenticating while connected to the network, requiring the user to login to the system while connected to the network periodically. Failure to do so will eventually disable access to the system until network-based-login is done.

Once authenticated, the handheld receiver 104 may communicate with the mobile sensor platform unit 102 to send various commands. These commands, for example, may be related to the operation of various sensors, data transfer, event flagging, data acquisition, diagnostics, modifying configuration/settings, starting and stopping of the units. The list of types of commands is merely for illustrative purposes and a greater or narrower scope of commands may be implemented.

The authentication cache 358 persistently stores authentication information on the handheld receiver unit 104. As previously mentioned, an algorithm may be utilized to limit how long cached authentication information can be used without refreshing from a live Internet connection.

Authentication may be conducted at a variety of levels, with different permissions set per level. For example, a supply chain analyst may have a higher level of permissions than a worker on the assembly line, with the higher level of permissions allowing the supply chain analyst to compare data received against data logged in a similar situation in another plant.

Backend Processor

Figure 4:
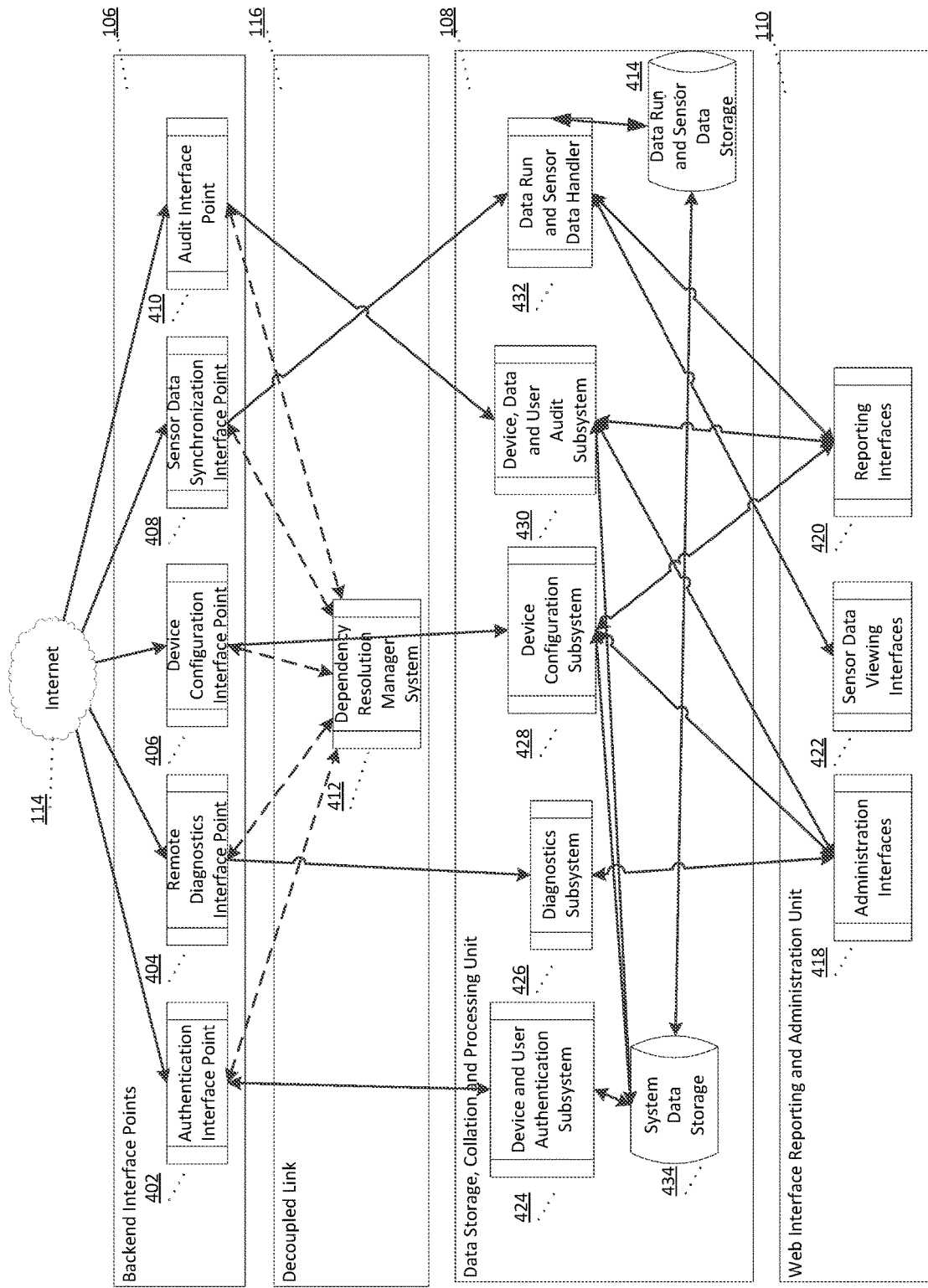
FIG. 4. is a schematic diagram of the backend processor, including the backend interface points; the data storage, collation and processing unit; and the web interface reporting and administration unit, according to some embodiments.

Referring to FIG. 4. the backend processor may comprise of one or more backend interface points 106; a decoupled link 116; a data storage, collation and processing unit 108; and one or more web interfaces 110.

Examining the backend processor in more detail, the backend processor provides interface points to upload, store and process data collected by one or more mobile sensor platform units 102 and to provide interfaces for users to interact with stored data, execute reports and to issue administrative commands via the one or more web interfaces 110 to one or more mobile sensor platform units 102.

In some embodiments, the backend processor is a web server application that is configured to receive information from one or more handheld receiver units 104 and to perform operations comprising sensor administration and configuration; handheld receiver unit application administration and configuration; system administration; data reporting, extraction and analytics.

The backend interface points 106 comprise of an authentication interface point 402, a remote diagnostics interface point 404, a device configuration interface point 406, a sensor data synchronization interface point 408, and an audit interface point 410.

The interface points, 402, 404, 406, 408, 410 may provide external access to the subsystems found within the data storage, collation and processing unit 108. The interface points may provide external access via one or more of a number of protocols including, but not limited to, SOAP web services, REST services, custom XML and JSON services, etc. The interface points provide authentication and authorization services to help ensure that only authorized users, client, sensor platform units, handheld data receiver units and systems are allowed to access the internal subsystems found within the data storage, collation and processing unit 108.

In some examples, the implementation may involve wrappers around the internal components. The interface points may be within the wrapped subsystem. An interface point may provide the stated functionality through the wrapped subsystem.

All interface points, 402, 404, 406, 408, 410 use the dependency resolution manager system 412 to determine which subsystem to route the requests to once the requests have been authenticated.

The authentication interface point 402 is an interface point for functionality related to user, handheld, sensor-platform, individual, site, client and location authentication. These types of authentication may include the ability to segment access groups and individuals to provide different levels of access and permissions to each of these groups. Further, authentication may also include the verification of the identity of a user, or also additional security measures to validate a user's credentials. Authentication may also include the verification of the authenticity of the sensor platform 102 and handheld receiver unit 104. Authentication may also include the verification of the location where the sensor unit 102 is being used. Typically, the sensor unit 102 devices are licensed to be used at one geographic location. The authentication module is responsible for enforcing the licensing agreement. For example if the sensor platform is licensed for one plant, then the authentication module will disallow use of the system at other plants. In some embodiments, if the platform is licensed for a set period of time (presumably extendable through recurring payments) then the authentication module will disallow use of the system if the license has expired.

The remote diagnostics interface point 404 is an interface point for functionality allowing remote problem diagnosis and reporting. Remote problem diagnosis and reporting functionality, for example, could include the ability to notify and remedy problems related to sensor malfunctions, sensor calibration, handheld receiver unit issues, software and firmware updates, among others. The remote diagnostic interface point 404 can be used to obtain diagnostic information from the remote devices as well as issue possible corrective commands to the remote devices. The remote diagnostics interface point 404 may issue an alarm or notification to either handheld receiver units or to the backend interfaces. Administrative users can use the appropriate administration interface 418 to diagnose the remote devices via appropriate commands to retrieve such information from the remote devices. Administrative users can use the appropriate administration interface 418 to issue corrective commands to the remote devices.

The device configuration interface point 406 is an interface point for functionality related to configuration of the handheld receiver units and sensor platform units from the web administrative interfaces over internet or intranet links. The device configuration interface point 406 may enable the remote configuration of the handheld receiver units as well as the sensor platform units, and also report the historical and current state of the configuration back to the backend interfaces. Configurable items on the sensor platform units 102 can include enabling/disabling of specific sensors, calibration of said sensors, threshold levels of said sensors, conversion formulas, etc. Configurable items on the handheld data receiver 104 can include radio link configuration, security configuration, configuration of automatic data syncing systems, etc.

The sensor data synchronization interface point 408 is an interface point for functionality related to the synchronization of captured sensor platform data.

The audit interface point 410 is an interface point for functionality related to auditing of actions performed on the handheld unit and the sensor platform units as well as the web interfaces 110. This functionality may include the ability to view the reports run on a handheld, to review the actions of certain groups and to review the amount of information transmitted by a sensor platform, among others. An example application of this functionality would be to check that a supply chain analyst did conduct a bi-weekly review of pressure data across the manufacturing plants in a geographical region.

The backend interface points 106 bi-directionally communicates with a dependency resolution manager 412 that resolves dependencies between objects and map objects at runtime. The dependency resolution manager is used to map specific backend functionality in the data storage, collation and processing unit 108 to the public backend interface points 106. This functionality enables the changing out of specific functionality based on the specific device, client, user, version, geo-location, etc. For example, the authentication interface point could map to a simple username/password device and user authentication subsystem 424 for one client but could map to single-sign-on device and user authentication subsystem 424 for another client to allow for easier user credential management by their system staff.

The data storage, collation and processing unit 108 stores, pre-processes, prepares and processes the collected data along with providing implementations of the subsystems and functionality exposed via the backend interface points 106. The data storage, collation and processing unit 108 may be comprised of the device and user authentication subsystem 424, diagnostics subsystem 426, device configuration subsystem 428, device, data and user audit subsystem 430, data run and sensor data handler 432, system data storage 434 and data run and sensor data storage 414.

In some embodiments, the system data storage 434 and data run and sensor data storage 414 may be separate storage devices, and also may mutually contain links to data contained in the other. The two storage systems may serve different storage requirements, specifically system settings and real-time and real and near-real-time sensor data feeds.

The data storage, collation and processing unit 108 may also conduct pre-processing of the collected data to aid the performance of report generation and execution. For example, where performance-intensive analytics are known to be run, the data storage, collation and processing unit 108 could anticipate these runs, pre-fetch and pre-process the collected data to reduce the number of calculations necessary at execution.

The data storage, collation and processing unit 108, may, in some embodiments, be a data warehouse, a flat database or a relational database.

Examples of processing that may be done by the data storage, collation and processing unit 108 include:
  Receiving reference data from standards organizations or manual input (e.g. the maximum pressure may be set out may be provided as an industry standard or a formulary guideline)
  Post-processing impact location analysis.
  Conducting queries of the collected data to run reports. These queries may be executed using methods known to a skilled user, such as SQL query language, SAS language, etc.
  Providing computational and analytics support for machine learning, application of heuristics-based approaches for independent variable identification in development of for example, neural networks.
  Pre-processing collected data to pre-fetch data to improve execution performance.
  Collating collected data from various sources and grouping the data. Providing tagging of data with metadata (e.g. date received, occurrence during an incident, related manufacturing stage, operator present, plant information, manufactured using instruction template 5 revision 6, manufacturing parameters exceeded).
  Adding unique identifiers to collected data to improve data integrity and performance for data record retrieval (e.g. the addition of primary and foreign keys).
  Adding associations between data points either automatically based upon a set of rules, or manually.
  Sort collected data according to date, identifiers, and metatags.
  Sending the data to external systems, especially those related to the plant control software or Supervisory Control and Data Acquisition (SCADA) systems providing an overview of the plant operations.

The system may connect to external systems for data exchange, processing, and controls, and so on. The authorization module 402 may implement licensing techniques using a licensing subsystem.

The one or more web interfaces 110 provide interfaces for the user to administer and report on the data collected by the mobile sensor platform. The one or more web interfaces may comprise of an administration interface 418, a reporting interface 420, and a sensor data viewing interface 422.

The administration interface 418 provides interfaces configured to receive information from one or more handheld data receiver unit applications and perform operations comprising sensor administration and configuration, system administration, handheld data receiver unit application administration and configuration, and data reporting and analytics.

Examples of data reporting and analytics may include:
- Searching for all data associated with the manufacture of a good.
- Searching for data associated with an incident, an individual operator, or a specific manufacturing machine.
- Conducting a comparison of data collected from all sensors active during an incident.
- Conducting a report comparing data collected between manufacturing plants.
- Conducting a report comparing data collected between different stages of a manufacturing line.
- Conducting a report comparing data collected from the same manufacturing line at different dates to look for variation over time or to determine force mitigation due to mechanical changes in the line.
- Conducting a report comparing data collected to best practices or reference data.
- Conducting machine-learning operations, such as the independent identification of variables related to a particular scenario or incident through inductive reasoning (e.g. the determination of correlation between two variables that were not known beforehand to be related, such as "black swan" events).
- Providing decision making support by providing reports based upon queries run by an operator or automatically by the system (e.g. machine 4 is old and has started to produce an unacceptable number of out-of-parameter sensor readings, therefore machine 4 is recommended to be placed upon a replacement schedule; the manufacturing facilities in a geographic location or region appear to be performing better than other manufacturing facilities due to climate, therefore future manufacturing facilities could be placed in areas of similar climate)

In some embodiments, the administration interface 418 further provides a client subsystem that determines the current status of licensing terms and conditions and provides a payment gateway integration to allow client payment for term expiry, modifications, and a change in license model.

In some embodiments, the administration interface 418 further provides a means by which to configure the mobile sensor platform units and their workings. For example, the interface allows for the enabling or disabling of specific sensors on the mobile sensor platform unit, the formulas used to interpret the collected data, the threshold levels below which collected data is ignored, etc.

In some embodiments, the administration interface 418 further provides a means by which to assign the mobile sensor platform units to a specific client or plant. For some classes of clients this can include the assignment to a sub-client, providing access to all data collected at said sub-client to the primary client's users.

The reporting interface 420 provides a subsystem to track and report hardware and software exceptions that exceed expected operational and force event thresholds within the sensor module, or view and produce current and historical reports on sensor modules for data analytics for quality assurance statistical process control and problem root cause analysis.

The sensor data viewing interface 422 may provide a client subsystem to display and review all sensor data collected from the mobile sensor platform unit 102 along with providing a subsystem to the reporting module to view, among others, individual sensor data by data field, by vector sum of xyz fields per tri-axial location, by velocity curve (specified time in microseconds), license information, and tracked and recorded sensor module exceptions. The sensor data viewing interface 422 may also offer the ability to compare data from various sensors, from various plants, various manufacturing steps, various reference data and various date/times to support the ability of an operator to view reports relevant to the particular analysis at hand. For example, an operator may wish to track an individual sensor's data to evaluate performance against a reference data to understand the variance and variability involved with a particular step of manufacture, and whether that variance has exceeded a certain threshold.

Figure 5:
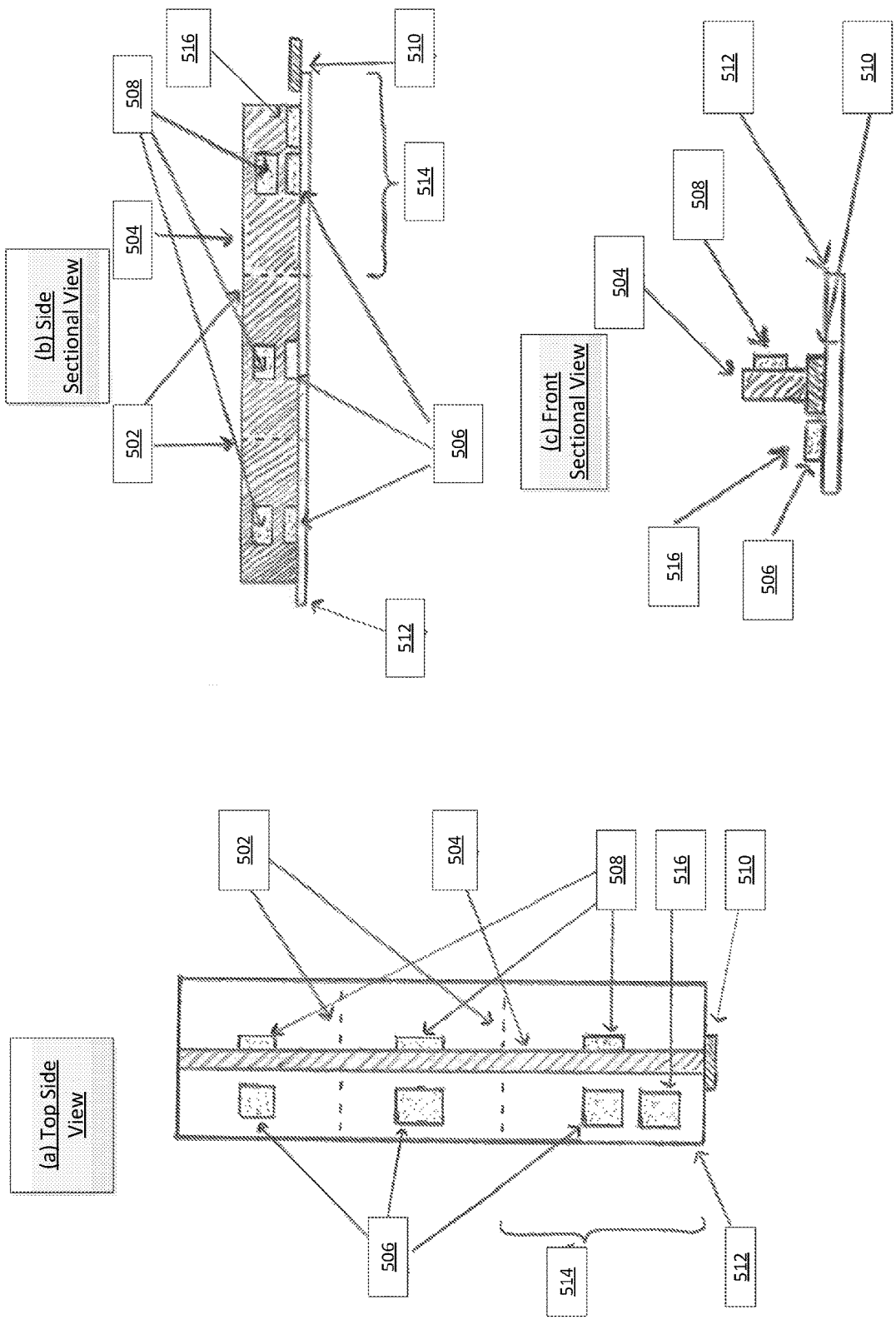

FIG. 5 shows a series of impact sensors on a circuit according to example embodiments. FIG. 5 shows views (a), (b) and (c), showing a top side view, a side sectional view, and a front sectional view of three sensors laid out in series on a circuit board according to some embodiments. 502 illustrates a series of scored points on the PCB allowing the PCB to be broken down to smaller sizes, potentially without affecting overall system usage. 504 illustrates a perpendicularly mounted PCB providing base on which to mount the Y-axis measuring accelerometers. In alternative embodiments, a tri-axial accelerometer may be used for sampling. 506 illustrates accelerometers measuring X-axis acceleration at 3 different vertical heights. 508 illustrates accelerometers measuring Y-axis acceleration. 510 illustrates a USB connector used for charging and data loading/unloading. 512 illustrates a main PCB. 514 the primary section of the circuit is shown (horizontal and vertical board included). The primary hardware including the main processing chip(s), radio and primary sensors may be located in this section of the PCB. The portions of the board located outside of this section may be removable while maintaining functionality of the circuit. Extra sensors can be located on the removable portions outside of this section. 516 illustrates accelerometers measuring Z-axis acceleration. This an example shape of the circuit (with sensors on board) that may be placed inside the model to be monitored. Other shapes may be used for different embodiments.

FIG. 6 shows a series of impact sensors on a circuit according to example embodiments. This is an example alternative layout for a circuit board. In this variation, there are tri-axial accelerometers which may reduce the number of accelerometers required. This variation may also use wireless charging and commands to charge the circuit and transfer data to/from the board. 520 illustrates accelerometers measuring X, Y, Z axis acceleration at 3 or 4 different vertical heights, for example. 522 illustrates a series of scored points on the PCB allowing the PCB to be broken down to smaller sizes without affecting overall system usage. 524 illustrates the main PCB. In this example there may be no perpendicular PCB components. 526 illustrates a primary section of the circuit. All primary hardware including the main processing chip(s), radio and primary sensors may be located in this section of the PCB. All portions of the board located outside of this section may be removable while maintaining functionality of the circuit. Extra sensors can be located on the removable portions outside of this section. Additionally, sensors attached to wires can be plugged into this primary section of the circuit, thus extending the technological sensing capabilities of the apparatus.

Figure 7:
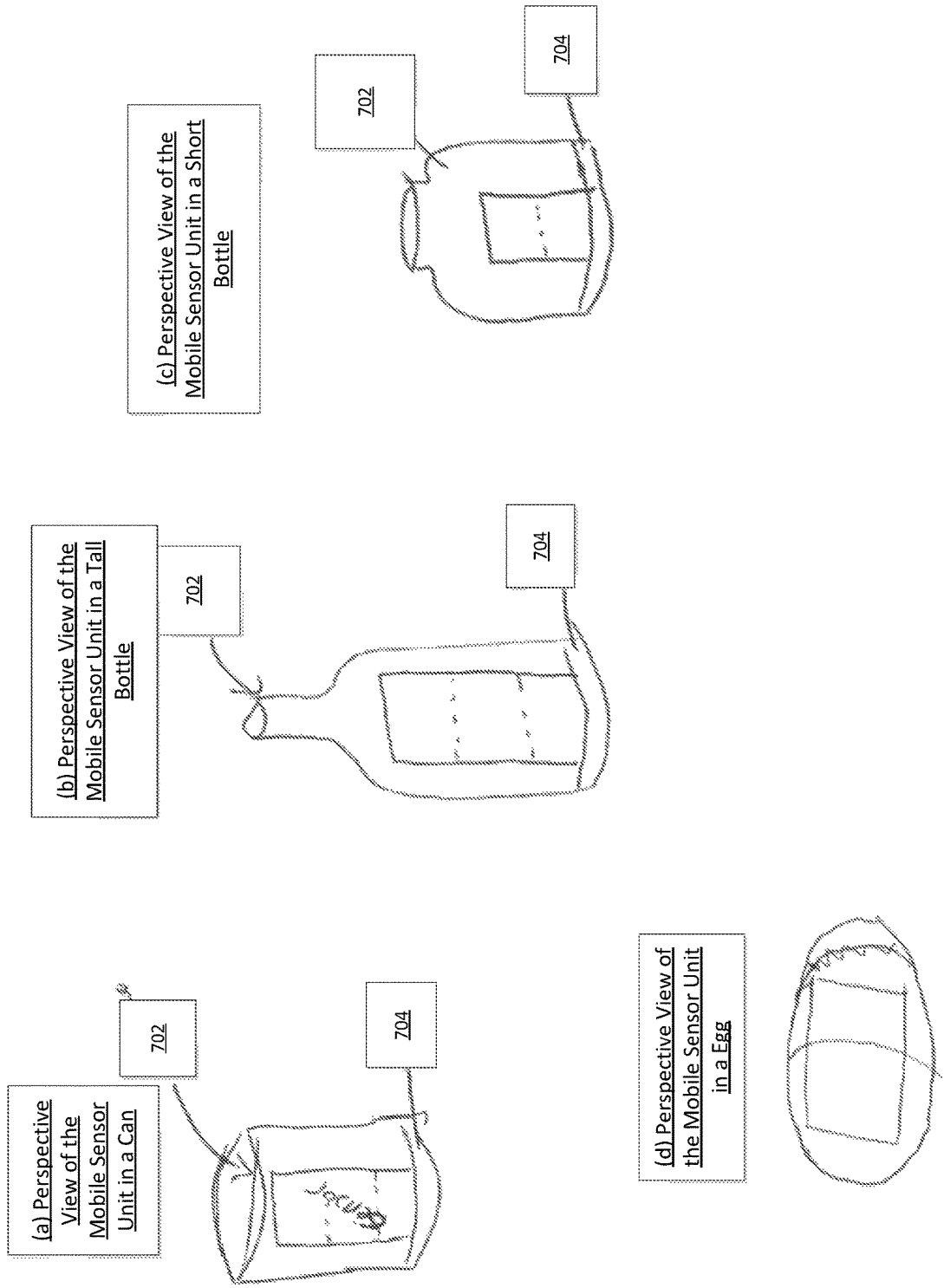

FIG. 7 shows a series of impact sensors on a circuit according to example embodiments. This is another example alternative layout for a circuit board with element 616 which is a battery mounted to the board. FIG. 7 shows views (a), (b) and (c), showing a top side view, a side sectional view, and a front sectional view of three sensors laid out in series on a circuit board according to some embodiments. 602 illustrates a series of scored points on the PCB allowing the PCB to be broken down to smaller sizes, potentially without affecting overall system usage. 604 illustrates a perpendicularly mounted PCB providing base on which to mount the Y-axis measuring accelerometers. In alternative embodiments, a tri-axial accelerometer may be used for sampling which is not shown in this example illustration. 606 illustrates accelerometers measuring X-axis acceleration at 3 different vertical heights. 610 illustrates accelerometers measuring Y-axis acceleration. 608 illustrates a USB connector used for charging and data loading/unloading. 612 illustrates a main PCB. 614 the primary section of the circuit is shown (horizontal and vertical board included). The primary hardware including the main processing chip(s), radio and primary sensors may be located in this section of the PCB. The portions of the board located outside of this section may be removable while maintaining functionality of the circuit. Extra sensors can be located on the removable portions outside of this section.

Figure 8:
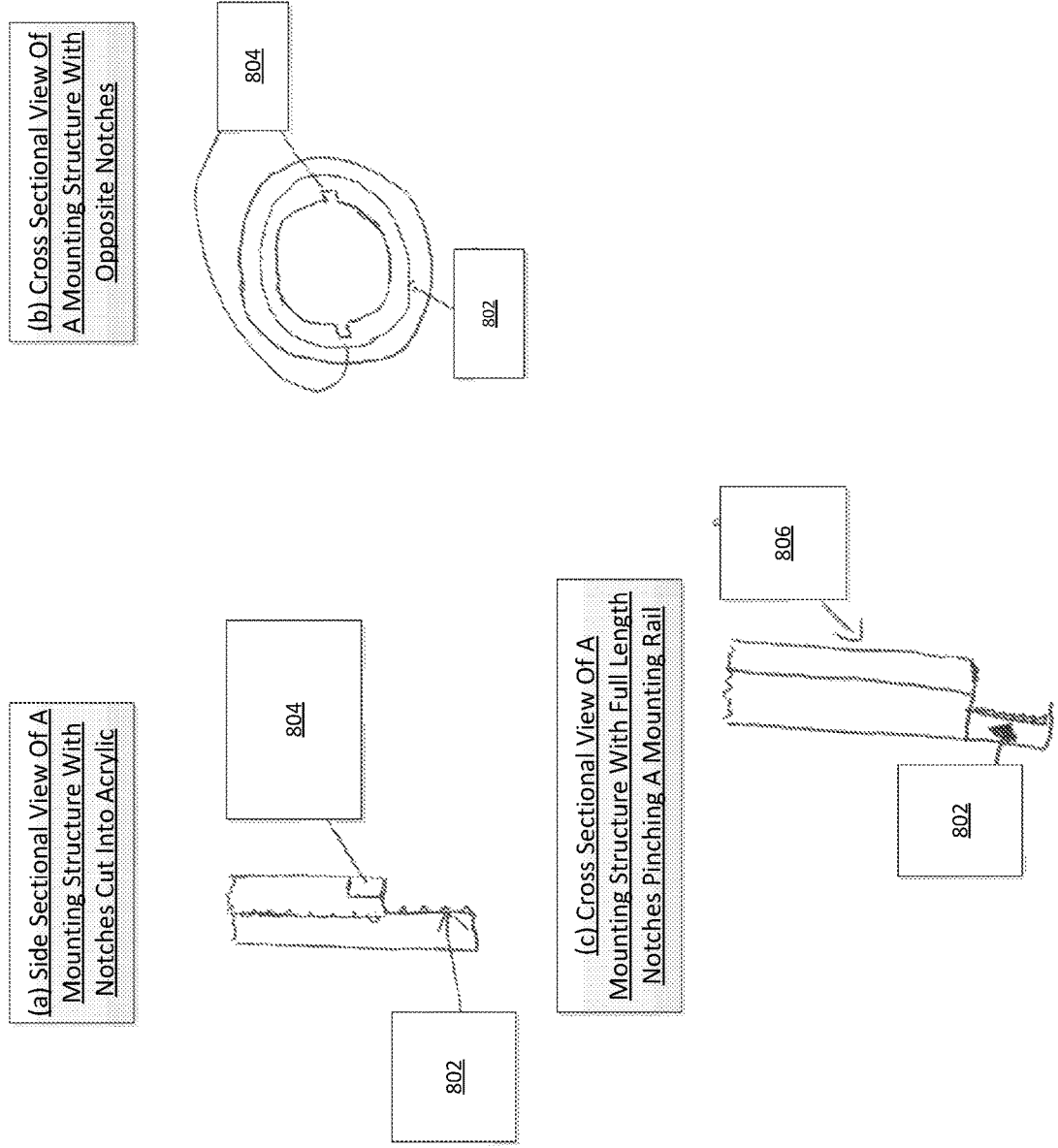
FIG. 8. comprises cross sectional views (a) and (b), showing two embodiments where a bottle containing the mobile sensor platform unit shown in FIG. 2. equipped with a pressure sensor, and an external temperature sensor, respectively.

FIG. 8 provides an illustration of one possible shape of the circuit, with sensors on board) that is positioned inside the model to be monitored, according to some embodiments. 702 illustrates a model that is shaped as the product under test. For example, it may be a shaped as a bottle having the same size/shape as the customer's final product. 704 illustrates electrical leads that may penetrate the model from the sensor outside of the model to the sensor platform circuit inside the model. 706 illustrates the sensor platform circuit as a whole that captures sensor data. 708 illustrates a pressure film mounted to the outside of the model to capture external pressure applied to the product under test. 710 illustrates a temperature probe mounted inside of a cavity in the model under test. It may be required to be on the outside to capture temperature changes in real-time or near real-time. FIG. 8 (*a*) illustrates a bottle with a pressure sensor, and FIG. 8 (*b*) illustrates a bottle with a temperature sensor.

FIG. 9 provides views (a), (b), (c) and (d), showing the mobile sensor platform of FIG. 2. contained within a can, a long-necked bottle, a short-necked bottle and an egg according to some embodiments. 802 illustrates the main portion of the model under test. 804 represents the "end-cap" that may be removable to access/remove the circuit inside the model under test. 806 illustrates a circuit inside the replica product.

FIG. 10 provides views (a), (b) and (c), (a) being a side sectional view of a mounting structure with notches cut into acrylic, (b) being a cross sectional view of a mounting structure with opposite notches, and (c) being a is a side sectional view of a mounting structure with full length notches pinching a mounting rail. The notches may be used to securely mount a circuit or a device. The circuit may have tabs that lockably attach into these notches and may be pinched by an end cap that may be threaded. 902 illustrates a model (in this example a bottle) that is threaded around its inner circumference to allow an end-cap to be threaded on at time of usage. The end-cap may provide protection from environmental factors such as water. The end-cap may also lock the tabs into the notches 904 to secure the circuit inside the model. 904 illustrates a notch cut into the inner diameter of the model. Tabs on the sensor circuit may lock into these notches to secure the circuit and potentially provide a secure mounting between the sensor circuit and the model. This may be advantageous to help increase accuracy and repeatability of measurements. 906 illustrates an alternative mounting system that replaces the notches 904 with a slot that runs the entire length of the inner diameter of the model. The sensor circuit can then be mounted into this slot. This mechanism can potentially provide an alternate mounting system that potentially increases the accuracy and repeatability of sensor data.

Figure 11:
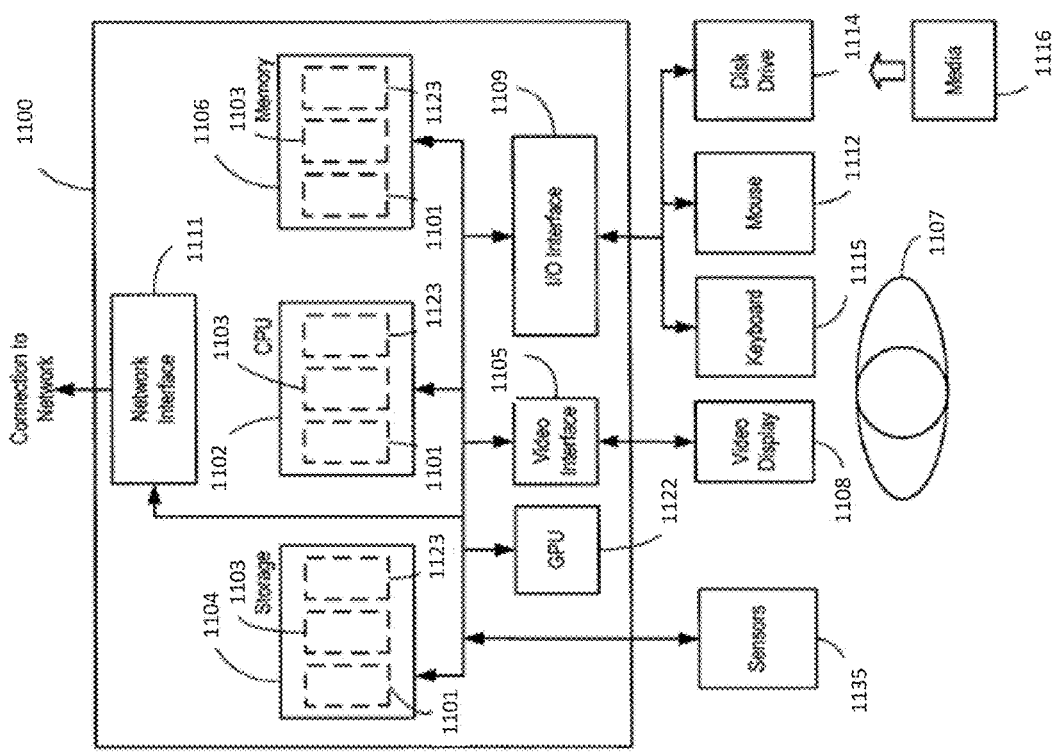
FIG. 11. illustrates an exemplary computer device that may be used as a server platform according to some embodiments.

The present system and method may be practiced in various embodiments. A suitably configured computer device, and associated communications networks, devices, software and firmware may provide a platform for enabling one or more embodiments as described above. By way of example, FIG. 11 shows an example computer device 1100 that may include a central processing unit ("CPU") 1102 connected to a storage unit 1104 and to a random access memory 1106. The CPU 1102 may process an operating system 1101, application program 1103, and data 1123. The operating system 1104, application program 1103, and data 1123 may be stored in storage unit 1104 and loaded into memory 1106, as may be required. Computer device 1100 may further include a graphics processing unit (GPU) 1122 which is operatively connected to CPU 1102 and to memory 1106 to offload intensive image processing calculations from CPU 1102 and run these calculations in parallel with CPU 1102. An operator 1107 may interact with the computer device 1100 using a video display 1108 connected by a video interface 1105, and various input/output devices such as a keyboard 1115, mouse 1112, and disk drive or solid state drive 1114 connected by an I/O interface 1109. In known manner, the mouse 1112 may be configured to control movement of a cursor in the video display 1108, and to operate various graphical user interface (GUI) controls appearing in the video display 1108 with a mouse button. The disk drive or solid state drive 1114 may be configured to accept computer readable media 1116. The computer device 1100 may form part of a network via a network interface 1111, allowing the computer device 1100 to communicate with other suitably configured data processing systems (not shown). One or more different types of sensors 1135 may be used to receive input from various sources.

The present system and method may be practiced on different computer devices including a desktop computer, laptop computer, tablet computer or wireless handheld. The present system and method may also be implemented as a computer-readable/useable medium that includes computer program code to enable one or more computer devices to implement each of the various process steps in a method in accordance with embodiments. In case of more than one computer device performing the entire operation, the computer devices are networked to distribute the various steps of the operation. It is understood that the terms computer-readable medium or computer useable medium comprise one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application may be implemented as a web service, where the mobile device includes a link for accessing the web service, rather than a native application.

The functionality described may be implemented to any mobile platform, including the iOS™ platform, ANDROID™, WINDOWS™ or BLACKBERRY™.

The embodiments described herein involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work. Computer hardware is essential to embodiments described herein, and it cannot be omitted or substituted for mental means without having a material effect on the operation and structure of the embodiments described herein. The computer hardware is essential to the embodiments described herein and is not merely used to perform steps expeditiously and in an efficient manner.

While illustrated in the block diagrams as groups of discrete components communicating with each other via distinct electrical data signal connections, the present embodiments are provided by a combination of hardware and software components, with some components implemented by a given function or operation of a hardware or software system. Further many of the data paths illustrated are implemented by data communication within a computer application or operating system. The structure illustrated is thus provided for efficiency of teaching example embodiments.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible in various circumstances.

The invention claimed is:

1. An integrated sensor system for production, packaging and distribution systems, comprising:
　at least one sensor platform having multiple on-board sensors configured to capture sensor data in real or near real-time to detect force, environmental and movement variables for an article within production, packaging and distribution systems, said sensors including a location sensor configured to identify a location in which said at least one sensor platform is being used;
　at least one handheld data receiver in communication with the sensor platform via a first communication protocol, said at least one handheld data receiver application configured to issue commands and process captured sensor data in real or near real-time for immediate reporting and feedback on the platform;
　one or more backend interface points configured to communicate with said at least one handheld data receiver application via a second communication protocol different from said first communication protocol, said one or more backend interface points including an authentication interface point and a remote diagnostics interface point;
　a backend processor for monitoring, capturing, processing and analyzing sensor data in real or near-real time, said backend processor configured to communicate with said one or more backend interface points via a third communication protocol including a decoupled link; and
　a web server application that is configured to receive data from the handheld data receiver via said backend processor, said web server application configured to perform operations comprising sensor data review, sensor administration and configuration, handheld data receiver application administration and configuration, system administration and data reporting and analytics, and provide an interface for a user to interact with stored data, execute reports and issue administrative commands to the at least one sensor platform;
　wherein said authentication interface point is configured to verify the location in which said at least one sensor platform is being used, and to disallow use of said at least one sensor platform with the said web server application when said authentication interface point determines that said location at which said at least one sensor platform is being used is not permitted,
　wherein the sensor data is captured during a contact force event to the article, wherein at least one of the data receiver and the web server is configured to calculate at least one additional parameter not directly measured by the sensors based on the captured sensor data,
　wherein the backend processor is configured to detect that a first sensor has malfunctioned, and to transmit a notification to the at least one handheld device that the first sensor has malfunctioned; and
　wherein the backend processor is configured to, responsive to receiving a command to disable the first sensor of the on-board sensors of the at least one sensor platform, disable the first sensor of the on-board sensors of the at least one sensor platform.

2. The system of claim 1 wherein the force, environmental and movement variables comprise at least one of acceleration in three axes measured at three different vertical positions on the sensor unit, force applied to the top of the article, sidewall pressure, temperature, rotation, ambient light, humidity, and position.

3. The system of claim 1 wherein one or more sensor platforms provide wireless communication using a wireless communication protocol and allow the handheld data receiver application to start data acquisition and receive real-time sensor data.

4. The system of claim 1 wherein one or more sensor platforms have settings stored in configuration files that provide unique device identification, security, and operational attributes for authentication and communication with a handheld data receiver application wherein the authentication of account credentials allows said receiver to communicate with the sensor platform to send one or more commands.

5. The system of claim 1 wherein the sensor platform is mounted and housed in a replica of the article in the approximate configuration and weight of the article and capturing real or near-real time movement, force and environmental data in the manner that would be experienced by the article in the production, packaging and distribution systems.

6. The system of claim 1 wherein the sensor platform transmits data on the estimation of tracking and current location positioning of said sensor platform.

7. The system of claim 1 wherein at least one of an acceleration sensor and a vibration sensor is utilized at a sampling rate to capture the entire acceleration waveform to measure the acceleration profile and determine velocity changes based on the acceleration profile.

8. The system of claim 1 wherein data is collected using a plurality of sensor configurations to record acceleration, impact which is closely associated with the acceleration values, internal and external pressures, internal and external temperature, rotation, ambient light, humidity and location data during the state of real time movement for a delicate and fragile article within a production, packaging and distribution activity.

9. The system of claim 1 wherein the sensor platform has a triaxial accelerometer, or a set of single-axis or dual-axis accelerometers configured in a triaxial configuration, having multiple on-board sensors detecting multiple force, environmental or movement variables including acceleration in all 3 axes measured at three different vertical positions on the sensor platform, force applied to the top of the article, sidewall pressure, rotation, temperature, ambient light, and humidity.

10. The system of claim 1 wherein values are collected via a wireless communication protocol, with each sensor's raw data being transmitted and captured and processed by a handheld data receiver application.

11. The system of claim 1 where the at least one additional parameter comprises a set of microsecond-level acceleration values transformed to produce velocity values.

12. The system of claim 1 wherein the sensor platform is mounted to provide acceleration and force measurement data within a desired range of statistical volatility.

13. The system of claim 1 wherein the sensor platform is capable of being calibrated to a desired statistical confidence level.

14. The system of claim 1 wherein the sensor platform captures the number of impacts or other force, environmental and movement events.

15. The system of claim 1 wherein one or more handheld data receiver applications authenticates and communicates with a sensor module using a wireless communication protocol to allow the handheld application to provide one or more commands to the sensor module.

16. The system of claim 1 wherein the sensor platform processes and converts sensor data in real time from digital signals or values to a corresponding impact, force or environmental value.

17. The system of claim 1 wherein the handheld data receiver application provides real time reporting on the sensor platform as data is being captured and provides a dynamic display of captured and/or processed data.

18. The system of claim 1 wherein the handheld data receiver application allows a user to mark and record the occurrence of a force event that occurs as said sensor platform is in a state of real time force, environmental or movement data capture during a production, packing, or distribution process and to correlate the event to a physical point of reference within such process.

19. The system of claim 1 wherein the handheld data receiver application transfers data to the web server application for further data analytics and data extraction.

20. The system of claim 1 wherein the web server application that is configured to receive information from one or more handheld data receiver applications and perform operations comprising sensor data review, sensor administration and configuration, system administration, handheld data receiver application administration and configuration, and data reporting and analytics.

21. The system of claim 20 wherein the web server application further comprises a subsystem to track and report hardware and software exceptions that exceed expected operational and force event thresholds within the sensor platform.

22. The system of claim 20 wherein the web server application further comprises a management subsystem to view status information on all sensor units, execute reports, issue commands to the sensor units or retrieve data from the sensor memory for maintenance and data management purposes, receive notification of hardware or software errors, provide software updates and upgrades to handheld data receiver application and provide wireless configuration administration to the handheld data receiver application to allow data communication with the sensor platform.

23. The system of claim 20 wherein the web server application further comprises an authentication and licensing subsystem to manage and control the usage of the sensor platform in accordance with the terms and condition associated with a client including, but not limited to, time-based licensing, location based licensing, facility based licensing and plant based licensing.

24. The system of claim 20 wherein the web server application further comprises a client subsystem to view and produce current and historical reports on sensor modules for data analytics for quality assurance statistical process control and problem root cause analysis.

25. The system of claim 20 wherein the web server application further comprises a client subsystem with a reporting module to view individual sensor data by data field, by vector sum of xyz fields per triaxial location, by velocity curve, by license information, and by tracked and recorded sensor module exceptions.

26. The system of claim 20 wherein the web server application further comprises a client subsystem that determines the current status of licensing terms and conditions and provides a payment gateway integration to allow client payment for term expiry, modifications, and a change in license model.

27. The system of claim 20 wherein the web server application further comprises a data warehouse for performing analytics.

28. The system of claim 20 wherein the web server application is further configured to perform machine learning.

29. The system of claim 1 wherein the backend processor or web server application or sensor platform or handheld application derives value information by a converted, correlated, interpreted and fused form of the sensor data which may be different than the form or units in which the information is measured in the sensor platform.

* * * * *